(12) United States Patent
Cunningham

(10) Patent No.: US 12,007,754 B2
(45) Date of Patent: Jun. 11, 2024

(54) SYSTEM AND METHODS FOR EVALUATING BOTTLING LINE PERFORMANCE

(71) Applicant: G3 Enterprises, Inc., Modesto, CA (US)

(72) Inventor: John Cunningham, Tracy, CA (US)

(73) Assignee: G3 Enterprises, Inc., Modesto, CA (US)

( * ) Notice: Subject to any disclaimer, the term of this patent is extended or adjusted under 35 U.S.C. 154(b) by 291 days.

(21) Appl. No.: 17/166,986

(22) Filed: Feb. 3, 2021

(65) Prior Publication Data

US 2021/0365011 A1    Nov. 25, 2021

Related U.S. Application Data

(63) Continuation-in-part of application No. 16/370,425, filed on Mar. 29, 2019, now Pat. No. 11,209,409.

(60) Provisional application No. 62/650,695, filed on Mar. 30, 2018.

(51) Int. Cl.
G05B 19/418 (2006.01)

(52) U.S. Cl.
CPC ..... *G05B 19/4184* (2013.01); *G05B 19/4183* (2013.01); *G05B 19/4185* (2013.01)

(58) Field of Classification Search
CPC ............ G05B 19/4184; G05B 19/4183; G05B 19/4185; G05B 2219/32015; G05B 19/41865; Y02P 90/02; Y02P 90/80
See application file for complete search history.

(56) References Cited

U.S. PATENT DOCUMENTS

| | | |
|---|---|---|
| 3,734,330 A | 5/1973 | Danner et al. |
| 2005/0067365 A1 | 3/2005 | Hanafusa et al. |
| 2006/0026971 A1 | 2/2006 | Sharpe |
| 2006/0076307 A1 | 4/2006 | Chung |
| 2014/0138276 A1 | 5/2014 | Smith et al. |
| 2015/0122688 A1* | 5/2015 | Dias ..................... A47G 19/027 206/459.1 |
| 2015/0301521 A1* | 10/2015 | Byron ................ G05B 19/4183 700/108 |
| 2015/0307245 A1 | 10/2015 | Puccini |

(Continued)

FOREIGN PATENT DOCUMENTS

| | | |
|---|---|---|
| CN | 2131419 Y | 5/1993 |
| CN | 2145560 Y | 11/1993 |

(Continued)

OTHER PUBLICATIONS

U.S. Appl. No. 17/525,358, filed Nov. 12, 2021, Bottle with Sensors for Probing and Optimizing Bottling Line Performance, Cunningham.

(Continued)

*Primary Examiner* — Xin Y Zhong
(74) *Attorney, Agent, or Firm* — Goodwin Procter LLP

(57) ABSTRACT

System and method for optimizing bottling line performance based on data received from a bottle with sensors. The system provides a bottle with sensors in a bottling line or maintenance system, a network gateway, a human machine interface (HMI) device, and a platform server. The HMI device provides for local control of the bottling line while the platform server handles distribution of GUIs, as well as data processing, data storage, and data analysis.

21 Claims, 26 Drawing Sheets

(56) References Cited

U.S. PATENT DOCUMENTS

| | | |
|---|---|---|
| 2015/0355012 A1 | 12/2015 | Gurumohan et al. |
| 2017/0156540 A1 | 6/2017 | Wheatley et al. |
| 2017/0192414 A1 | 7/2017 | Mukkamala et al. |
| 2020/0326684 A1 | 10/2020 | Chand et al. |

FOREIGN PATENT DOCUMENTS

| | | |
|---|---|---|
| DE | 102015102590 A1 | 8/2016 |
| EP | 1665135 B1 | 8/2016 |
| WO | WO-2015/036535 A1 | 3/2015 |
| WO | WO-2015/069916 A1 | 5/2015 |
| WO | WO-2015/188068 A1 | 12/2015 |
| WO | WO-2019/191670 A1 | 10/2019 |

OTHER PUBLICATIONS

International Search Report and Written Opinion for International Patent Application No. PCT/US2019/024981, dated Jun. 27, 2019 (9 pages).

International Search Report and Written Opinion for International Patent Application No. PCT/US2022/014843, dated May 31, 2022 (13 pages).

\* cited by examiner

1100

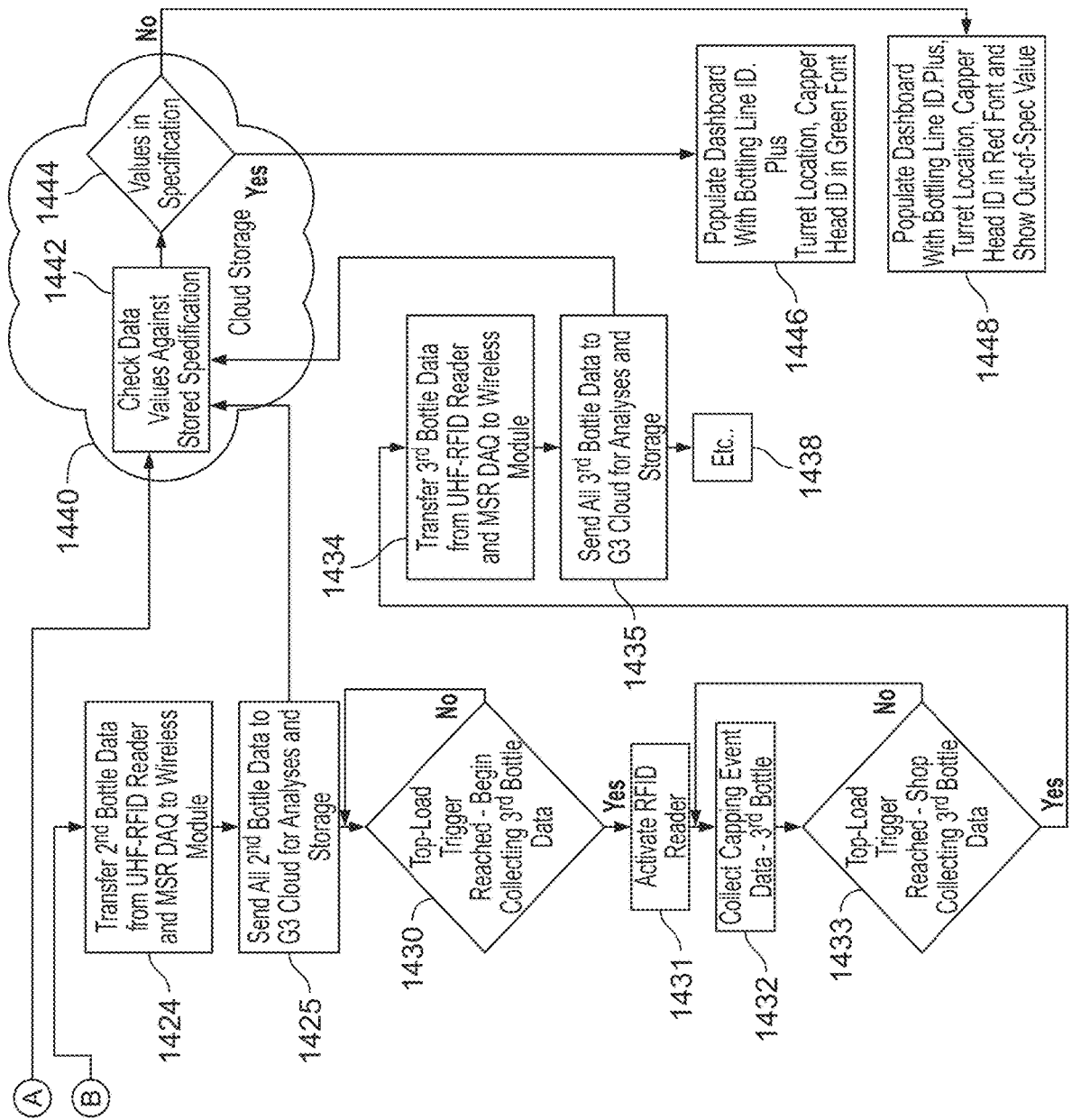
Figure 14(Contd...)

SYSTEM AND METHODS FOR EVALUATING BOTTLING LINE PERFORMANCE

RELATED APPLICATIONS

The present application is a continuation in part of and claims priority to U.S. patent application Ser. No. 16/370,425 titled "Bottle with Sensors for Probing and Optimizing Bottling Line Performance", filed on Mar. 29, 2019, which claims priority to U.S. provisional patent application 62/650,695, filed Mar. 30, 2018, entitled "A BOTTLE WITH SENSORS FOR PROBING AND OPTIMIZING BOTTLING LINE PERFORMANCE" the entire disclosure, both of which are fully incorporated herein by reference.

FIELD

The present disclosure relates in general to the field of industrial systems, and in particular, to a bottle with sensors for probing and optimizing bottling line performance.

BACKGROUND

Systems exist for filling and capping or corking of bottles to contain any variety of juices, beers, wines, ciders or other carbonated or non-carbonated liquids. However, these systems are often expensive, and often require numerous unit operations and have a high degree of complexity. Due to these factors, these complex and costly systems are generally purchased by companies or individuals looking to fill a large number of bottles and are generally only cost effective when these machines fill and bottle with minimal downtime and finished package defects.

In-line inspection and control systems for bottling lines can start with empty package container checks and proceed through container rinsing, filling, fill-level inspection, in-line weight checking, closure application inspection, label application inspection, and final packaging. Inspections systems are typically stand-alone that operate with either push rejection devices or progressive diverters for a more gentle removal of defective product from the process. Inspection systems typically use cameras and sensors along the bottling and packaging line to assess the bottling process and packages being produced.

SUMMARY

A bottle with sensors for probing and optimizing bottling line performance is disclosed. According to one embodiment a bottle, comprises an outer layer and a reservoir tube inside the outer layer that connects a reservoir inside the outer layer to a neck of the bottle. The bottle has a battery inside the outer layer and one or more sensors powered by the battery.

The above and other preferred features, including various novel details of implementation and combination of elements, will now be more particularly described with reference to the accompanying drawings and pointed out in the claims. It will be understood that the particular methods and apparatuses are shown by way of illustration only and not as limitations. As will be understood by those skilled in the art, the principles and features explained herein may be employed in various and numerous embodiments.

BRIEF DESCRIPTION OF THE DRAWINGS

The accompanying drawings, which are included as part of the present specification, illustrate the various embodiments of the present disclosed system and together with the detailed description of the preferred embodiments given below serve to explain and teach the principles of the present disclosure.

Figure 1:
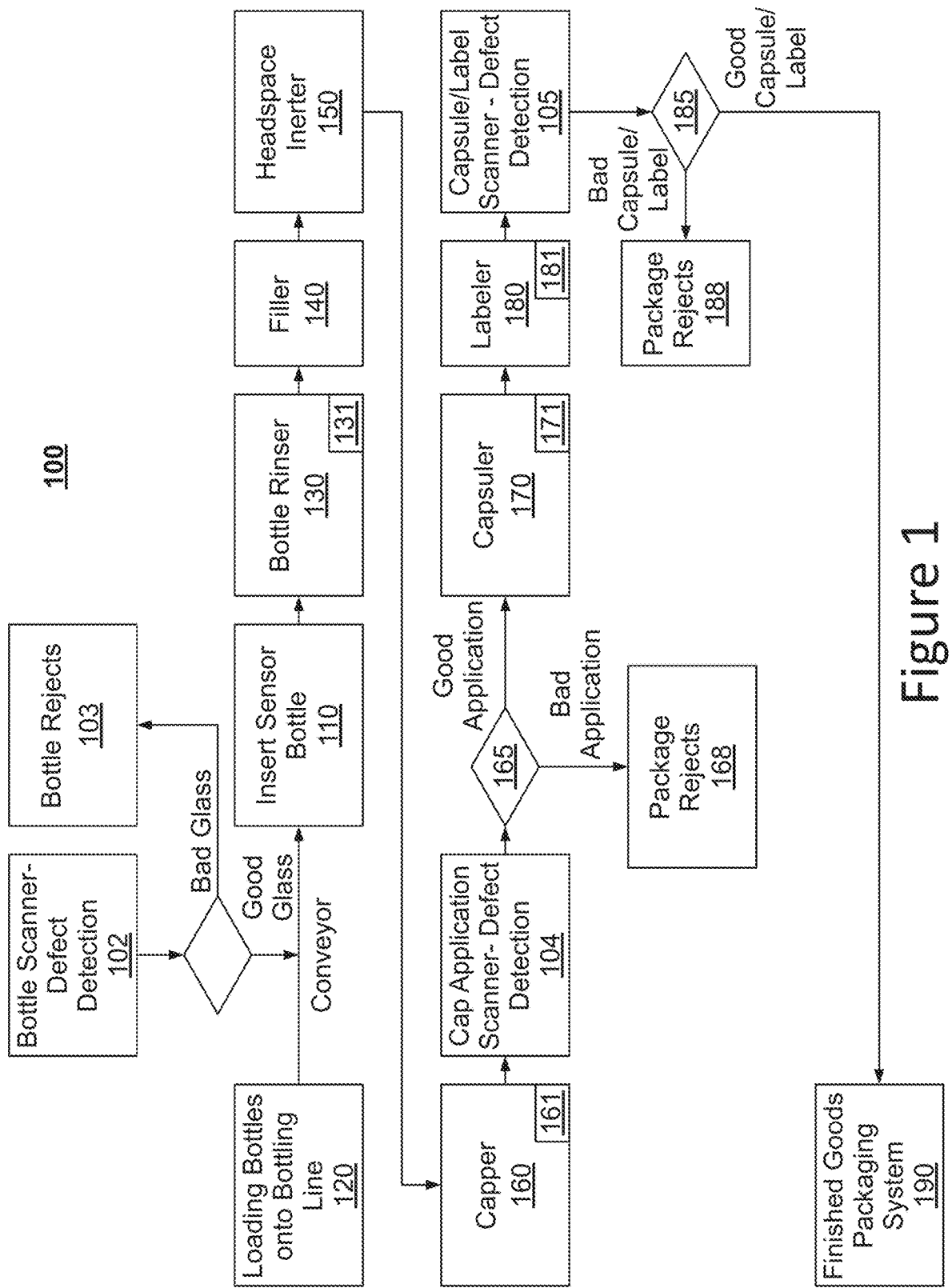
FIG. 1 depicts a screw-cap bottling line system for use with the present bottle, according to some embodiments.

It should be noted that the figures are not necessarily drawn to scale and that elements of structures or functions are generally represented by reference numerals for illustrative purposes throughout the figures. It also should be noted that the figures are only intended to facilitate the description of the various embodiments described herein. The figures do not describe every aspect of the teachings described herein and do not limit the scope of the disclosure.

DETAILED DESCRIPTION

A bottle with sensors for probing and optimizing bottling line performance is disclosed. According to one embodiment a bottle comprises an outer layer acting as the bottle's body and an opening at the top allowing for a beverage to enter a tube inside the outer layer that connects to a reservoir inside the outer layer allowing the bottle to run through a rinser and/or filler. The bottle also has a battery or other energy source inside the outer layer and one or more sensors powered by the energy source.

The disclosure provides for a bottle with sensors ("the present bottle"), which collects data from various stages of a bottling line process train, such as a screw-cap bottling line applying screw-caps and a cork bottling line inserting cork closures. By way of example only, the disclosed technology may be used for capping and corking bottling line set-ups, bottling line troubleshooting, and providing knowledge for predictive maintenance. Such systems can have the purpose of filling bottles with beverages, such as wines, sparkling wines, spirits, teas, coffees or nutraceuticals.

The present bottle allows for pre-bottling capper-head set-up, capper-head set-up confirmation, troubleshooting during commercial bottling runs, and prediction of equipment wear and potential break-downs or inefficiencies in the bottling line processes. Data from the present bottle alone or combined with bottling line data from other sources, such as; vision systems, fixed sensors installed in the various unit operations and PLC outputs may be used to create predictive mathematical models to further improve process set-ups, fault detection, troubleshooting, and predictive maintenance. Additionally, the generated data from any of these sources can be transmitted to a variety of systems including directly to a technician's smart device for immediate feedback during equipment set-up, directly to a gateway through wireless technologies and then to a technician's smart device or a processes controller for set-up and automated controls, and cloud storage systems, where additional analyses transformations and predictive analytics can be performed to create valuable recommendations for the bottling line mechanics, managers, and owners. These recommendations can be geared towards improving the bottling line's efficiency and profitability.

Figure 6:
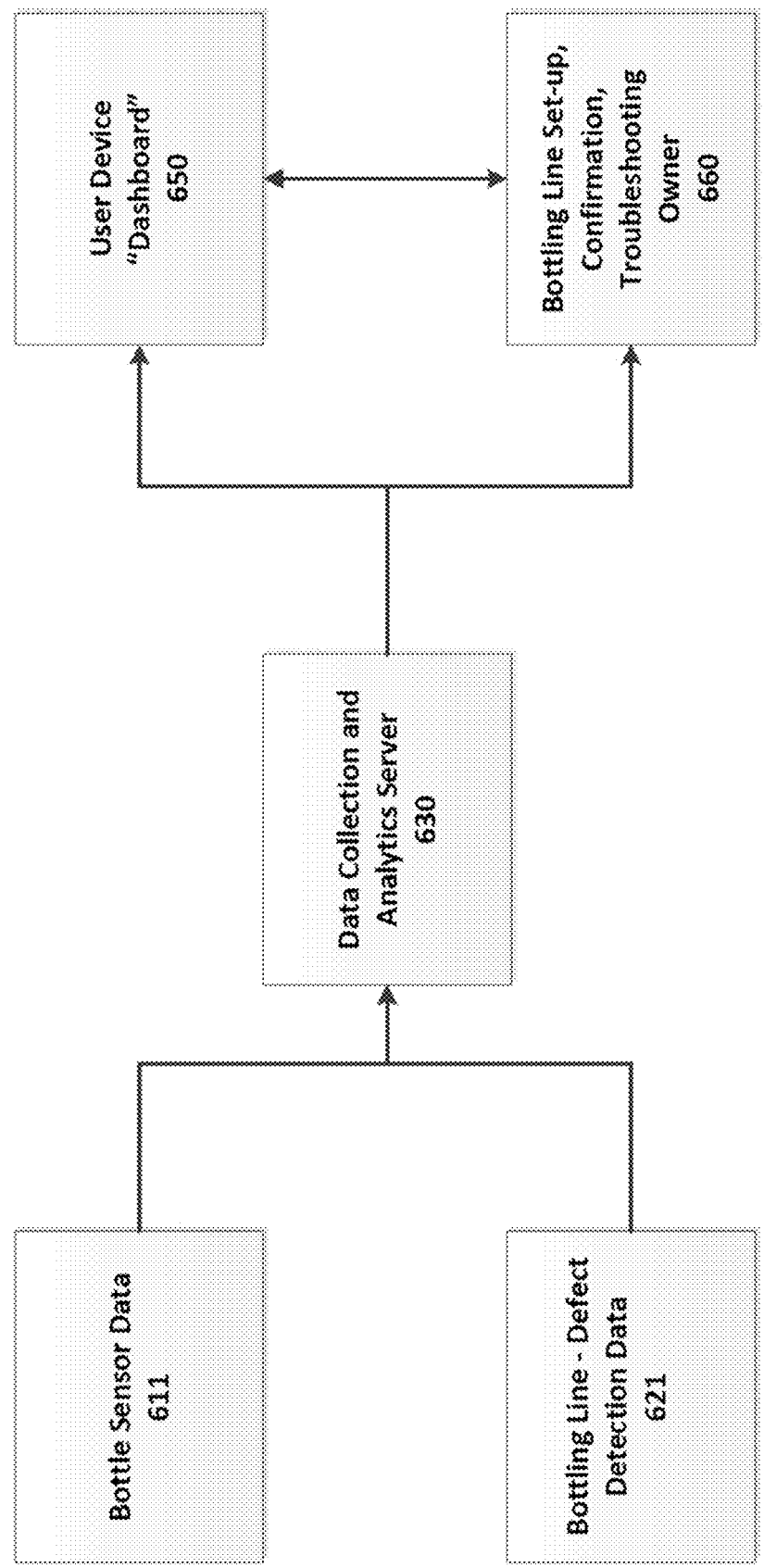
FIG. 6 depicts an exemplary network that collects and analyzes data from various sources including the sensor bottle and displays predictions and recommendations on devices, according to some embodiments.

FIG. 1 illustrates a screw-cap bottling line system 100, according to one embodiment. A screw-cap bottling line system 100 serves to fill containers, for example, glass bottles, with a beverage, such as wine, sparkling wine, or spirits. The screw-cap bottling line system 100 is outfitted with a bottle scanner defect detection system 102 that determines the bottle's fitness for use immediately after loading bottles onto bottling line 120. The data generated from the bottle scanner-defect detection system 102 can be transmitted, as depicted in FIG. 6, as bottling line-defect detection data 621 to a data gateway and collection/analytics server 630 for immediate feedback to the user via the user device dashboard 650 and for inclusion into predictive models. The present bottle 110 is transported on the screw-cap bottling line system 100 by a conveyance system (not shown). The present bottle 110 performs data collection functions at each step of the screw-cap bottling line system 100, and transmits that data for purposes of confirming that the bottling line set-up conditions are proper and providing input to predictive models used to generate crucial process information. The predictions from these analytics models are then sent to the proper devices and personnel, at the proper time, so actions can be taken to ensure that the screw-cap bottling line system 100 is functioning correctly and efficiently.

The present screw-cap bottling line system 100 includes an operation to load the empty bottles onto the bottling line 120, a bottle rinser 130, a filler 140, a headspace inerter 150, a capper 160, a capsuler 170, a labeler 180, and a finished goods packaging system 190, according to one embodiment. As the present bottle 110 is transported down the screw-cap bottling line 100, the present bottle 110 collects data, for example temperature, pressure, speed, vibrations, and chemical concentrations, and transmits that data for analysis, as described in more detail below.

The system to load the empty bottles onto the bottling line 120 involves transferring an empty bottle from a pallet or case to the line's conveyance system. In certain embodiments, loading bottles onto botting line 120 is outfitted with a bottle scanner-defect detection system 102 that scans the bottles as they are being loaded onto the bottling line for finish characteristics such as sealing surface roughness, D-dimension (e.g., distance from top of neck to where pilfer is tucked under the glass), D-angle (e.g., the sharpness of the angle in the glass that the pilfer tucked is created), thread depth, bottle height, and cocked-neck. If any of these bottle characteristics measure outside of values that can be compensated for by process adjustments, the bottle is rejected to bottle rejects 103. In certain embodiments, during line setup or troubleshooting, the present bottle 110 is inserted into the conveyance system to collect vibration and G-force data as it is transported from its insertion location to the bottle rinser 130.

Figure 3:
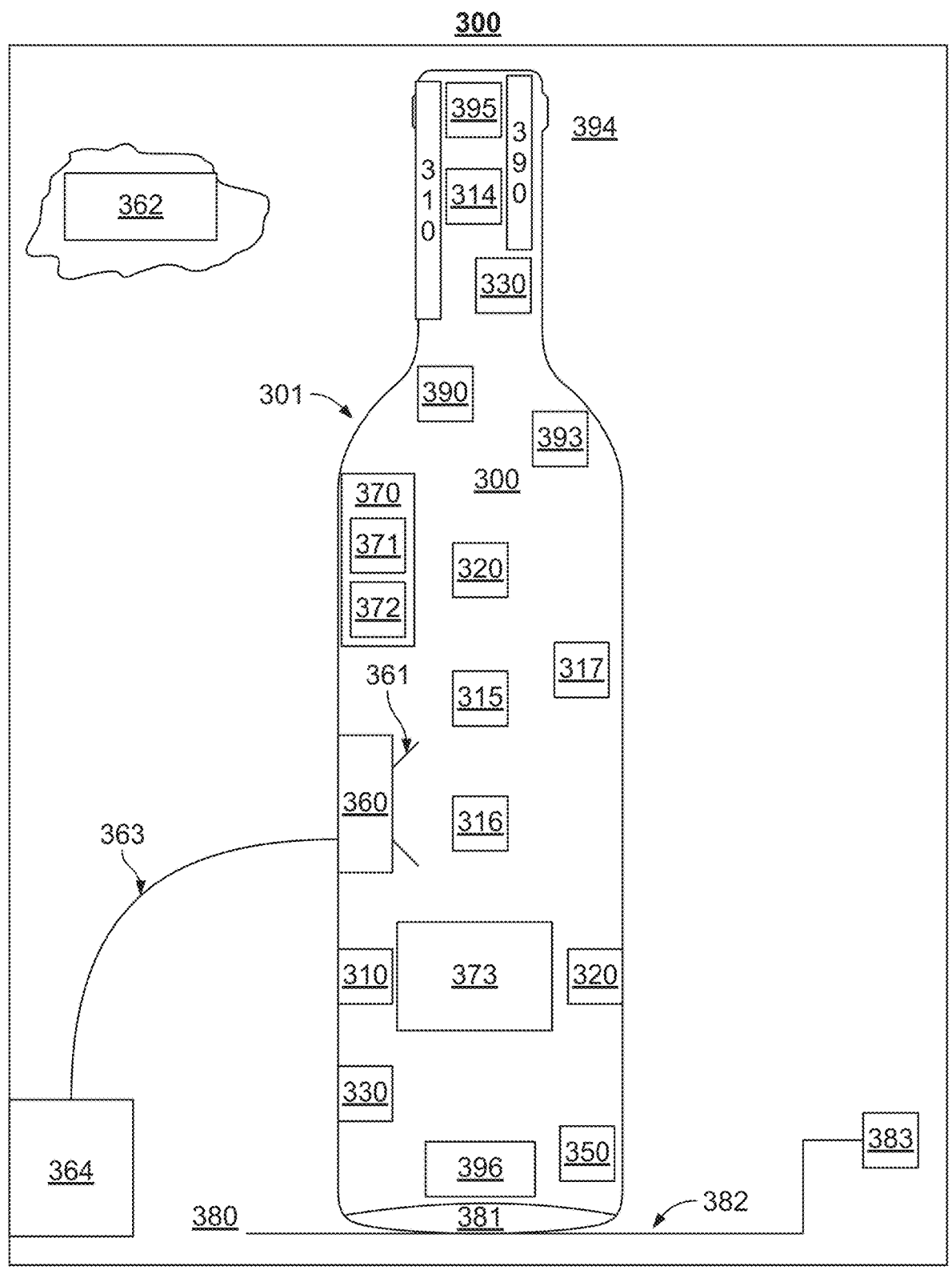
FIG. 3 depicts an exemplary sensor bottle, according to some embodiments.

The rinser 130 injects rinse solution into the present bottle 110, for example, to remove foreign material and help sanitize the bottle in preparation for filling it with the desired beverage. In certain embodiments, the present bottle 110 includes an internal pressure sensor 320, an internal temperature sensor 310, and an internal chemical sensor 330, as depicted in FIG. 3. The internal pressure sensor 320 measures the rinse solution pressure levels. The internal temperature sensor 310 serves to measure the temperature of the rinse solution 131. The internal chemical sensor 330 quantifies chemical property data, such as the pH of the rinse solution 131. The present bottle 110 is then transported to the filler 140.

The filler 140 applies a force to the top of the present bottle 110 to create a seal between the fill head and the bottle prior to dispensing a measured amount of a desired beverage, for example wine, into the present bottle 110. In certain embodiments, the force applied for this seal is measured by the force sensor 373. In certain embodiments, the internal pressure of the present bottle 110 is also measured by the internal pressure sensor 320. This force and pressure data are analyzed, to determine if the system is filling within the prescribed conditions for the beverage and bottles, since the filling process could be negatively impacted if the forces or pressures are improper. In one embodiment, the beverage fill height is measured by a level sensor 390 in the internal neck cavity of the present bottle 110. In certain embodiments, the present bottle 110 has an oxygen sensor 314 that measures the headspace oxygen concentration. In certain embodiments, the present bottle 110 has a sensor 316 in the internal body that measures the oxygen concentration, a pressure sensor 320 measuring internal bottle pressure and a temperature sensor 310 measuring the beverage temperature. In certain embodiments, the present bottle 110 includes a carbon dioxide sensor 315 to measure the amount of carbon dioxide contained in the beverage. The present bottle 110 is then transported through the headspace inerter 150 where the headspace oxygen sensor 314 senses the oxygen levels to ensure the inerting system is performing properly before moving to the capper system 160.

The capper system 160 applies a cap 161, which is made of a malleable metal such as aluminium, to the present bottle 110 by first applying a top load force to properly compress the cap liner. The capper system 160 then applies a thread roller force at the proper location to roll the malleable metal into the glass bottle's threads forming a grooved, tight, screw-like fit to the package. The capper system 160 then applies a pilfer roller force to tuck the cap 161 metal under a lip in the glass bottle allowing the cap's bridges to break and the skirt of the cap to remain on the bottle once the cap is removed by the consumer. This feature is important for providing consumers with pilfer evidence. In one embodiment, the measurements taken and recorded by the present bottle 110 include top-load force, thread roller position, thread roller force, pilfer roller position and pilfer roller force. In one embodiment, after the cap is applied, certain measurements are recorded by present bottle 110, such as the wine fill height, headspace oxygen concentration, and the wine's dissolved oxygen concentration allowing for the calculated estimate of the total package oxygen (TPO) that provides data to determine the quality of oxygen management in the filling, inerting and capping process.

At this stage of the screw-cap bottling line system 100, in certain embodiments, data regarding the cap application quality is generated by the cap application scanner-defect detection system 104. This system confirms a cap is installed properly by examining for and quantifying when possible reform depth, thread depth, thread start, thread runout, thread cuts, pilfer tuck, pilfer cuts and if possible, also checks/confirms the beverage fill height. In further embodiments, the cap application scanner-defect detection system 104 data can be combined with data previously collected by the present bottle 110 during line set-up or line troubleshooting and data collected by the bottle scanner-defect detection system 102 to predict if the package is of high enough quality to proceed to the capsuler 170 and to make recommendations regarding screw-cap bottling line system 100 adjustments required to improve performance. If the package is deemed defective it is sent to package rejects 168. If the data analytics indicates the package has acceptable quality it is cleared to proceed to the capsuler 170. The present bottle 110 is then transported to the capsuler 170.

The capsuler 170 applies a heat-shrink or roll-on capsule 171 to the neck of the present bottle 110, and applies heat or roller force to apply the capsule on the bottle's top. In one embodiment, the measurements taken and recorded by the present bottle 110 include temperature distributions and locations over time or roller forces and locations over time. The present bottle 110 is then transported to the labeler 180.

The labeler 180 involves applying a product label 181 to the body of the bottle using an adhesive, for example, the labeler 180 applies the product label 181 to the present bottle 110. In certain embodiments, the present bottle 110 has a sensor that measures the forces the bottling line exerts to apply the label to determine if the application is uniform. In certain embodiments, during production of the beverage package an external capsule/label scanner-defect detection system 105 measures and detects defects such as bubbles, wrinkles, or an uneven application of the heat-shrink/roll-on capsule 171 and the label 181. The external capsule/label scanner-defect detection system 105 also detects fish eyes that form due to moisture trapped under the capsule along with other defects such as burn marks or holes in the heat-shrink or roll-on capsule 171. In certain embodiments, during production of the beverage package the capsule/label scanner-defect detection system 105 scans the product label 181 for defects, such as wrinkles, scuffing, incorrect position, incorrect orientation, and flagging-edges, which can result from raw material or process issues. If defects exceed acceptable quality limits on the package, the package is sent to package rejects 188. During setup or troubleshooting the present bottle 110 is transported to finished goods packaging 190. All information regarding package defects can be sent to the user in real-time and stored for future review, including information generated from modelling the responses using the data streams. This information could include the number of rejects, the rate of rejects and the percent of total production rejected at any time.

The finished goods packaging 190 involves moving the present bottle 110 from the labeler 180 to packaging, which can include placing the finished product into a corrugated cardboard box. In certain embodiments, the present bottle 110 measures vibration and g-force data using internal 3-axis accelerometers 317 to detect excessively rough handling in the finished goods packaging 190 area. Data showing excessively rough handling would indicate that the system is set-up incorrectly, is malfunctioning, or the control parts are worn/broken.

Figure 2:
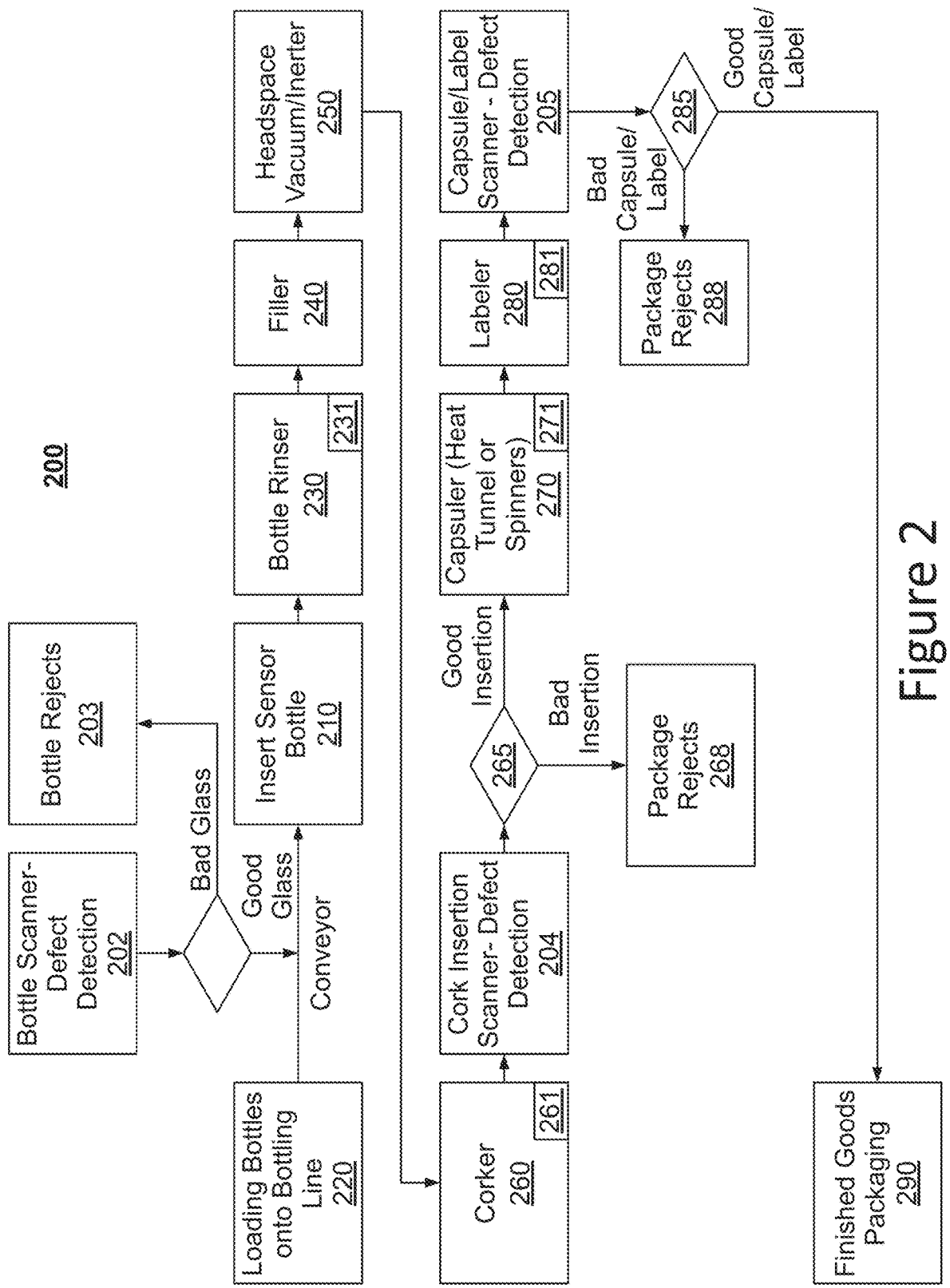
FIG. 2 depicts a cork closure bottling line system for use with the present bottle, according to some embodiments.

FIG. 2 illustrates a cork closure bottling line system 200, according to one embodiment. A cork closure bottling line system 200 serves to fill containers, for example, glass bottles, with a beverage, such as wine, sparkling wine, or spirits. The cork closure bottling line system 200 is outfitted with a bottle scanner defect detection system 202 that determines the bottle's fitness for use immediately after loading bottles onto loading bottles onto bottling line 220. The data generated from the bottle scanner-defect detection system 202 can be transmitted, as depicted in FIG. 6, as bottling line-defect detection data 621 to a data gateway and collection/analytics server 630 for immediate feedback to the user via the user device dashboard 650 and for inclusion into predictive models. The present bottle 210 is transported on the cork closure bottling line system 200 by a conveyance system (not shown). The present bottle 210 performs data collection functions at each step of the cork closure bottling line system 200, and transmits that data for purposes of confirming that the bottling line set-up conditions are proper and providing input to predictive models used to generate crucial process and product quality information. The predictions from these analytics models are then sent to the proper devices and personnel, at the proper time, so actions can be taken to ensure that the cork closure bottling line system 200 is functioning correctly and efficiently.

The present cork closure bottling line system 200 is comprised of a system to load empty bottles onto bottling line 220, a bottle rinser 230, a filler 240, a headspace vacuum/inerter 250, a corker 260, a capsuler (heat tunnel or spinners) 270, a labeler 280, and a finished goods packaging 290, according to one embodiment. As the present bottle 210 is transported down the cork closure bottling line system 200, the present bottle 210 collects data, for example temperature, pressure, speed, vibrations and chemical data, and transmits that data for analysis, as described in more detail below.

The system to load the empty bottles onto the bottling line 220 involves transferring an empty bottle from a pallet or case to the line's conveyance system. In certain embodiments, loading bottles onto bottling line 220 is outfitted with a bottle scanner-defect detection system 202 that scans the bottles as they are being loaded onto the bottling line for finish characteristics such as the bottle bore profile, bottle height, and cocked-neck. If any of these bottle characteristics measure outside of values that can be compensated for in process adjustments, the bottle is rejected to bottle rejects 203. In certain embodiments, during line setup or troubleshooting, the present bottle 210 is inserted into the conveyance system to collect vibration and G-force data as it is transported from its insertion location to the bottle rinser 230.

The rinser 230 injects rinse solution into the present bottle 210, for example, to remove foreign material and help sanitize the bottle in preparation for filling with the desired beverage. In certain embodiments, the present bottle 210 includes an internal pressure sensor 320, an internal temperature sensor 310, and an internal chemical sensor 330, as depicted in FIG. 3. The internal pressure sensor 320 measures the rinse solution pressure levels. The internal temperature sensor 310 serves to measure the temperature of the rinse solution 231 The internal chemical sensor 330 quantifies chemical property data, such as the pH of the rinse solution 231. The present bottle 210 is then transported to the filler 240.

The filler 240 applies a force to the top of the present bottle 210 to create a seal between the fill head and the bottle prior to dispensing a measured amount of a desired beverage, for example wine, into the present bottle 210. In certain embodiments, the force applied for this seal is measured by the force sensor 373. In certain embodiments, the internal pressure of the present bottle 210 is also measured by the internal pressure sensor 320. This force and pressure data is analyzed, to determine if the system is filling within the prescribed conditions for the beverage and bottles, since the filling process could be negatively impacted if the forces or pressures are improper. In one embodiment, the beverage fill height is measured by a level sensor 390 in the internal neck cavity of the present bottle 210. In certain embodiments, the present bottle 210 has an oxygen sensor 314 that measures the headspace oxygen concentration. In certain embodiments, the present bottle 210 has a sensor 316 in the internal body that measures the beverage oxygen concentration, a pressure sensor 320 measuring the internal bottle pressure and a temperature sensor 310 measuring the beverage temperature. In certain embodiments, the present bottle 210 includes a carbon dioxide sensor 315 to measure the amount of carbon dioxide contained in the beverage. The present bottle 210 is then transported through the headspace vacuum/inerter 250 to the corker 260.

The corker 260 compresses and inserts a cork 261, which can be made from the bark of *Quercus suber*, (oak trees that produce corks wood used in natural cork closures), agglomerated cork, plastic materials, or other compounds formed into a proper cylindrical cork form, to the present bottle 210. This corking process involves centering the present bottle 210 under the cork locks, the cork locks compressing the cork to the proper diameter, and a push rod pushing the compressed cork into the present bottle 210 neck. The cork then expands from its compressed state to fill, and apply force to, the inside of the present bottle 210 neck. In one embodiment, the measurements taken and recorded by the present bottle 210 include the force of the expanding cork against the neck, the time it takes to achieve a steady-state force, and the insertion location of the cork in the present bottle 210 bottle. In one embodiment, after the cork insertion, certain measurements are recorded by present bottle 210, such as the fill height of the wine, headspace oxygen concentration, and the dissolved oxygen concentration in the wine allowing for the calculated estimate of total package oxygen ("TPO") that provides data to determine the quality of oxygen management in the filling, vacuum/inerting and corking process.

At this stage of the cork closure bottling line system 200, in certain embodiments, data regarding the cork insertion quality is generated by the cork insertion scanner-defect detection system 204. System 204 confirms that a cork is inserted properly by examining its top and bottom insertion depth and, if possible, also checks the beverage fill height. In further embodiments, the cork insertion scanner-defect detection system 204 data can be combined with data previously collected by the present bottle 210 during line set-up or line troubleshooting and data collected by the bottle scanner-defect detection system 202 to predict if the package is of high enough quality to proceed to the capsuler 270 and to make recommendations regarding cork closure bottling line system 200 adjustments required to improve performance. If the package is deemed defective it is sent to package rejects 268. If the data analytics indicates the package has acceptable quality it is cleared to proceed to the capsuler 270. The present bottle 210 is then transported to the capsuler 270.

The capsuler 270 applies a heat-shrink or roll-on capsule 271 to the neck of the present bottle 210, and applies heat or roller force to apply the capsule on the bottle's top. In one embodiment, the measurements taken and recorded by the present bottle 210 include temperature distributions and locations over time or roller forces and locations over time. The present bottle 210 is then transported to the labeler 280.

The labeler 280 involves applying the product label 281 to the body of the bottle using an adhesive, for example, the labeler 280 applies the product label 281 to the present bottle 210. In certain embodiments, the present bottle 210 has a sensor that measures the forces the bottling line exerts to apply the label 281 to determine if the application is uniform. In certain embodiments, during production of the beverage package an external capsule/label scanner-defect detection system 205 measures and detects defects such as bubbles, wrinkles, or an uneven application of the heat-shrink/roll-on capsule 271 and the label 281. The external capsule/label scanner-defect detection system 205 also detects fish eyes that form due to moisture trapped under the capsule along with other defects such as burn marks or holes in the heat-shrink or roll-on capsule 271. In certain embodiments, during production of the beverage package the capsule/label scanner-defect detection system 205 scans the product label 281 for defects, such as wrinkles, scuffing, incorrect position, incorrect orientation, and flagging-edges, which can result from raw material or process issues. If defects exceed acceptable quality limits on the package, the package is sent to package rejects 288. During setup or troubleshooting the present bottle 210 is transported to finished goods packaging 290. All information regarding package defects can be sent to the user in real-time and stored for future review, including information generated from modelling the responses using the data streams. This information could include the number of rejects, the rate of rejects and the percent of total production rejected at any time.

The finished goods packaging 290 involves moving the present bottle 210 from the labeler 280 to packaging, which can include placing the finished product into a corrugated cardboard box. In certain embodiments, the present bottle 210 measures vibration and g-force data using internal 3-axis accelerometers 317 to detect excessively rough handling in the finished goods packaging 290 area. Data showing excessively rough handling would indicate that the system is set-up incorrectly, is malfunctioning, or the control parts are worn/broken.

FIG. 3 depicts an exemplary sensor bottle 300, according to one embodiment. The present bottle 300 has an outer layer 301 that can be made using various metals and plastics placed in strategic locations to withstand the rigors of commercial bottling systems. According to one embodiment, outer layer 301 is plastic to facilitate the wireless sending of data generated from the sensors on the bottle and the reading of ultra-high frequency (UHF) radio frequency identification (RFID) tags located on unit operations, such as, capper heads, cork locks, and turret positions plus strategic locations throughout the bottling line allowing the bottle to send location data along with associated process data to feed through analytics models to generate recommendations to users. This data can be used to determine areas of the bottling line, and settings for specific units, that need attention. The present bottle 300 measures and collects data for set-ups, set-up confirmations, troubleshooting, and predictive maintenance in bottling line unit operations and systems. For example, temperature, pressure, and chemical data can be measured, collected, and transmitted for analysis, as described in more detail below.

In one embodiment, the present bottle 300 includes several sensors for data collection purposes, such as an external bottle top temperature sensor 310, which measures the temperature distribution on top of the bottle, and an internal temperature sensor located in the reservoir tube 430 that measures the temperature of the contents of the bottle, for example the temperature of a rinse solution and/or beverage. The present bottle 300 includes an internal pressure sensor 320 that collects data on internal pressures created by the rinser, filler, and the beverage after the closure is applied. In certain embodiments, a force sensor or sensors 373 in the bottle measure the top load force applied on the bottle 300, for example the force applied by a filler or a capper head. The present bottle 300 includes a chemical sensor 330 in the lower portion of the reservoir tube 430, which measures, for example, acidity, sugars, alcohol, oxygen and $CO_2$ concentrations of the liquid in the bottle, and a chemical sensor 330 in the upper portion of the reservoir tube 430 that measures the levels of various gasses in the bottle's headspace, such as oxygen, and $CO_2$. In certain embodiments, the present bottle 300 includes a 3-axis accelerometer 317, which can measure and detect the movement of the bottle, and also detect if the bottle has experienced excessive shocks due to impact with control parts or bottling line components that are worn or out of alignment. In certain embodiments, the present bottle 300 includes a vacuum/pressure sensor 350, which can detect faults such as no or inadequate vacuum, high headspace pressure, leaks or other defects that may occur in the capping or corking bottling line systems.

The present bottle 300 includes a data acquisition/signal conditioner 360 such as an MSR model 43. In certain embodiments, the data acquisition/signal conditioner 360 can internally measure and record conditions such as temperature, humidity, light, pressure, and acceleration, and is equipped to perform such measurements simultaneously with each data point time and date stamped. According to one embodiment, the data acquisition/signal conditioner 360 also has 8 analog input channels capable of sampling at a rate of 1024 hertz. In another embodiment, data acquisition/signal conditioner 360 samples at rates exceeding 1 million samples per second. In another embodiment, the data acquisition/signal conditioner 360 has more than 8 analog input channels and can include a number of digital inputs. These analog inputs can include voltage or amperage readings from a variety of sensors including force sensing resistors, load cells, chemical, proximity, location, temperature, etc. Digital inputs can include data streams describing a device's address and description. In certain embodiments, the data acquisition and signal conditioner 360 has a built-in transmission wireless device, such as a Bluetooth or WiFi system 361, for transmitting data such as temperature, humidity, light, pressure, force, chemical and acceleration or any variety of digital data such as capper head identification, to a storage and data management device, such as a cloud server (e.g., data gateway and collection/analytics server 362) for review, analysis, and user recommendation generation. In another embodiment, the data transmission occurs via a wired connection 363 to a data collection and analytics server 364 or 630.

The present bottle 300 includes an output module 370, which can be equipped with indicator lights 371 and a display 372 to relay information such as proper bottle operation, and faults. In certain embodiments, if the output module 370 detects a fault, it automatically requests a new bottle via communication to the bottling line set-up, confirmation, troubleshooting owner 660 and includes transmission of shipping return information for the defective bottle.

The present bottle 300 includes a power source and regulation device 380. In certain embodiments, the power source is a rechargeable battery, for example, a rechargeable lithium battery 381. In one embodiment, the rechargeable lithium battery 381 can charge wirelessly when placed on charging base 382, which is connected to an AC power source 383.

The present bottle 300 also includes an ultra-high frequency (UHF) radio frequency identification (RFID) reader 393. RFID reader 393 works with UHF RFID tags placed on each component (and subcomponent) in system 100 and system 200. For example, an RFID tag may be placed on each capper head of capper system 160 to identify individual capper heads and on each turret location of capper system 160 to identify the individual capper head's location allowing the sensor readings to be associated with a particular capper head and location. RFID tags may also be read from the corker heads and corker turret locations of corker system 260.

The present bottle 300 may also have grooves 394 on its upper neck matching the target thread and pilfer roller positions for aiding a mechanic when adjusting the roller positions on capper heads. In addition, the present bottle 300 has bearings 395 at the top of the neck and bearings 396 at the bottom of the bottle to allow the mechanic the ability to easily rotate bottle 300 when under a capper head on a set-up device or a capper head installed on a turret in a process such as shown in system 100.

Figure 4:
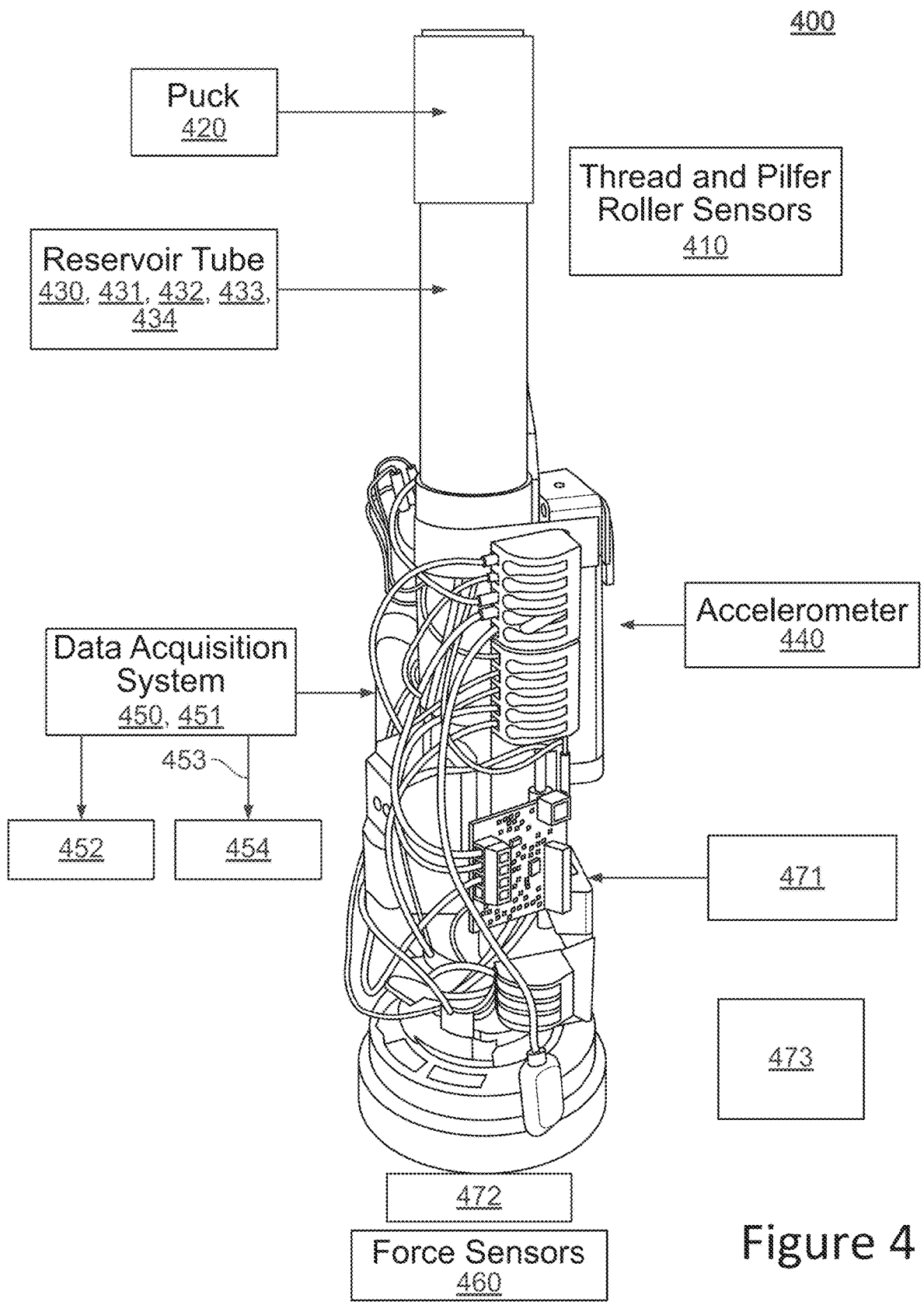
FIG. 4 depicts an exemplary sensor bottle, according to some embodiments.

FIG. 4 depicts an exemplary sensor bottle 400, according to one embodiment. The present bottle 400 has an outer layer (not shown) made of a metal, such as stainless steel and aluminium, to withstand the rigors of a commercial bottling line filler and capper. The present bottle 400 allows for data collection for capper head set-up, capper head set-up confirmation through the capper turret at production speeds, troubleshooting during a commercial bottling run, and data generation for the development of analytics models for predictive maintenance, for example g-force data, pressure data, and position data, and transmits that data either wired or wirelessly for analysis, as described in more detail below. According to another embodiment, the outer layer is made using a suitably durable plastic or plastic/metal combination.

In one embodiment, the present bottle 400 includes several force sensors. The present bottle 400 includes thread and pilfer roller sensors 410, for example, Tekscan Flexi-Force 100 lb. force sensors. The thread and pilfer roller sensors 410 detect thread and pilfer roller forces, to ensure that the thread and pilfer rollers will create quality threads and pilfer tucks, respectively. If the thread force is too high, the rollers might cut through the cap metal and if too low, the threads might not be rolled into the bottle's threads deep enough, leading to a defect called "spinners" where the cap's threads strip before the bridges break during package opening resulting in the cap remaining on the bottle and spinning in place. If the pilfer force is too high, the roller might cut through the cap metal or cause the cap bridges to break and if too low might not tuck the pilfer deep enough leading to a defect called "lifters" where the entire cap skirt lifts off of the bottle during opening and the cap's bridges never break. If this happens, it becomes difficult to detect whether the bottle has been tampered with because someone could remove the entire cap skirt, tamper with the contents, and then replace the cap skirt without detection.

The present bottle 400 can include a puck 420, such is a stainless steel disc within the neck of the bottle that covers the thread and pilfer roller force sensors 410. In certain embodiments, there are two or more pucks 420, one or more that covers the thread roller force sensor, and one that covers the pilfer roller force sensor.

The present bottle 400 includes a reservoir tube 430 that receives a rinse solution from the bottle rinser and/or a beverage, such as wine, from the bottling line filler. In certain embodiments, the reservoir tube 430 includes a sensor 431 that measures the headspace pressure. The reservoir tube 430 can have chemical sensors 432 at the top and bottom of the tube that are scanned by a reader 433, to determine chemical properties, such as the oxygen concentration of the contents of the present bottle 400. The chemical sensor reader 433 might also measure the pH of the contents of the present bottle 400. In certain embodiments the reservoir tube 430 includes a temperature sensor 434 to measure the temperature of the liquid contents of the present bottle 400.

In certain embodiments, the present bottle 400 includes an 3-axis accelerometer 440. The accelerometer 440 is an electromechanical device that can measure and detect the movement of the bottle, and also detect if the bottle has experienced excessive physical impacts due to misaligned, excessively worn, or broken bottling line components. This vibration data can be stored along with bottle location data for analysis using various analytics techniques in order to interpret vibration patterns and to provide the user with advice concerning any actions that need to be taken to ensure the line is being maintained and set-up properly.

In one embodiment, the present bottle 400 includes a data acquisition and signal conditioner 450. In certain embodiments, the data acquisition and signal conditioner 450 can measure and record temperature, humidity, light, pressure, and acceleration, and is equipped to perform such measurements simultaneously. In certain embodiments, the data acquisition and signal conditioner 450 has a built-in transmission wireless device, such as a Bluetooth or WiFi system 451, for transmitting recorded data such as temperature, humidity, light, pressure, acceleration, and any sensor data from the analog input channels to a cloud server 452 for review, analysis, and recommendation generation. Some embodiments may include wirelessly transmitting data to a wireless gateway (e.g., using WiFi, ZigBee, Bluetooth, etc.) that facilitates communication with cloud server 452. In another embodiment, the data transmission occurs via a wired connection 453 to a server 454 over a gateway or network.

The present bottle 400 includes top load force sensors 460 on the bottom of the bottle. In one embodiment, the present bottle 400 has four Tekscan 100 lb top load force sensors configured to measure total loads as high as 700 pounds 460. In another embodiment, the force is measured by a load cell set-up to measure top loads as high as 700 lbs. In certain embodiments, the pressure of the top load force is measured by the top load force sensors 460, and the force data is analyzed to help ensure the proper filling and cap application conditions are being met.

The present bottle 400 includes a power source and regulation device (not shown). In certain embodiments, the power source is a rechargeable battery, for example, a rechargeable lithium battery 471 inside the data acquisition system housing. In one embodiment, the rechargeable lithium battery 471 can charge wirelessly when placed on charging base 472, which is connected to an AC power source 473.

Figure 5:
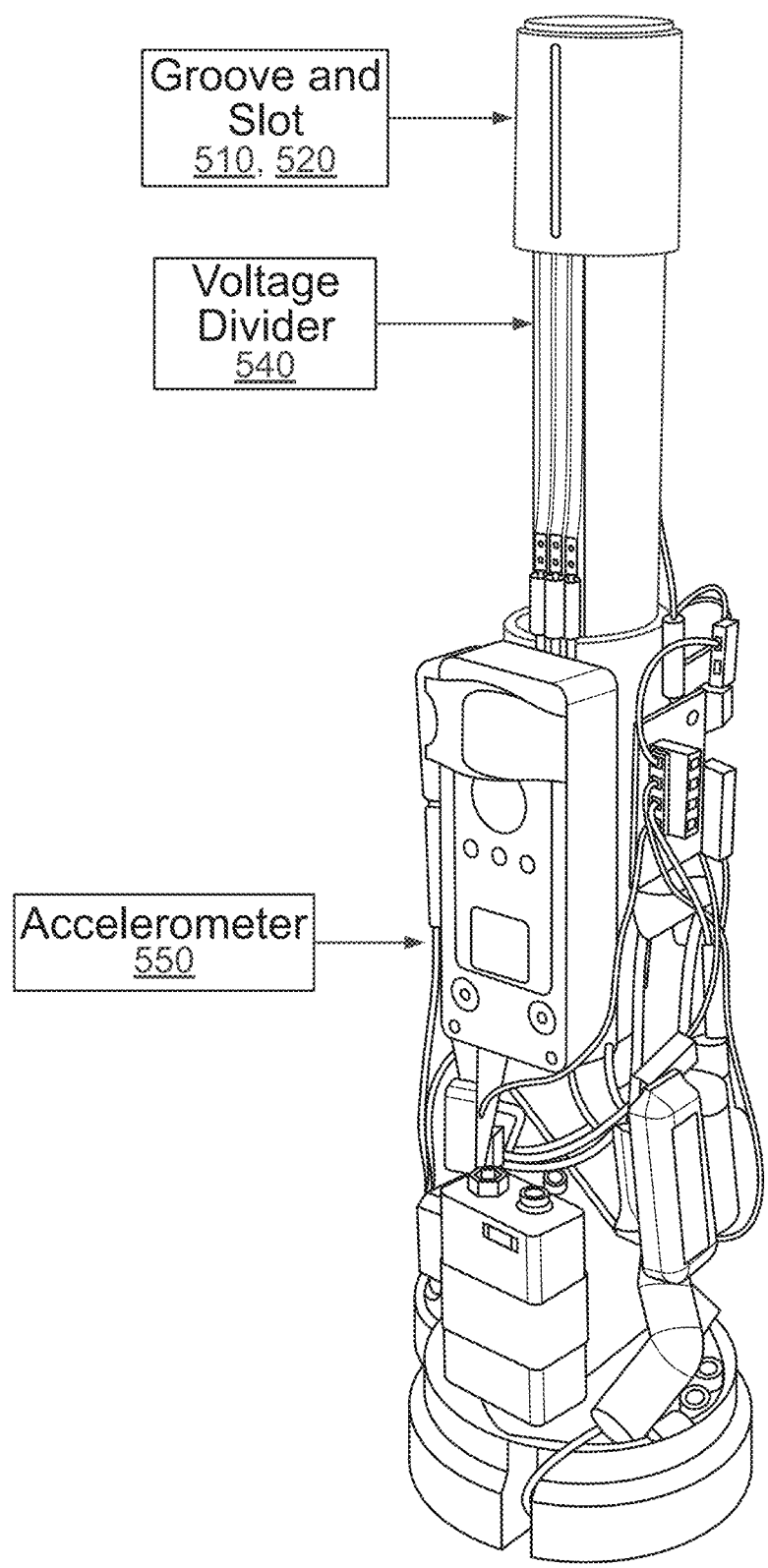
FIG. 5 depicts an exemplary sensor bottle, according to some embodiments.

FIG. 5 depicts an exemplary sensor bottle 500, according to one embodiment. The present bottle 500 has an outer layer sensor shell made of a metal, such as stainless steel, to withstand the pressures of the capper rollers of the bottling systems. The present bottle 500 allows for capper head set-up, capper head set-up confirmation at production speeds through the capper turret, troubleshooting during a commercial bottling run, and development of analytics models for predictive maintenance. For example temperature data, pressure data, and chemical data are collected by the sensor bottle 500 which then transmits that data for analysis, as described in more detail below.

In certain embodiments, the present bottle 500 has a sensor shell with a groove and slot 510, 520 for the insertion of an elastic piece, such as rubber, that is pushed into the voltage divider 540, for example, a Tekscan FlexiPot strip position sensor, by thread or pilfer rollers passing over it. When the voltage divider is touched by the deflected rubber piece, a voltage is generated that can be correlated to a position relative to a datum, such as the top of the present bottle 500. The position of thread and pilfer rollers is important for the proper application of a screw cap and this data can help ensure that the screw-cap thread-start is proper and that the pilfer rollers are contacting the proper location of the cap for the specific bottle finish. The electronic data from the voltage divider can be directly sent through predictive models at the edge network to generate immediate recommendations to the user and can also be sent to storage for later use.

In certain embodiments, the present bottle 500 includes an accelerometer 550. The accelerometer 550 is an electromechanical device that can measure movement of the bottle, and also detect if the bottle has experienced excessive physical impacts due to misaligned, excessively worn, or broken bottling line components or other shocks. Data from the accelerometers can be sent through predictive models for immediate feedback to the user. This feedback could include warnings and recommendations regarding control part settings/adjustments, warnings regarding excessive wear on control parts, recommendations for worn parts that likely need replacing, and requests to order spare parts or preventative maintenance services to help ensure that the line is serviced before a breakdown occurs.

FIG. 6 depicts an exemplary network that converts and sends data at the edge, collects data, analyzes data, and generates recommendations to the bottle user, according to one embodiment. Network system 600 collects and analyzes data transmitted by a bottle with sensors and a bottling line defect detection system taking various measurements and collecting data from equipment and materials used in bottling line systems. A data acquisition rate suitable for allowing the analytic models to provide accurate predictions and recommendations to the user at the right time will be specified and used (e.g., 1000 Hz).

In certain embodiments, the network system 600 may be a wired or wireless communication network, and can utilize edge network computing and feedback for high speed response, including responses fast enough to send signals to a commercial process for automatic adjustments to process setpoints, and cloud computing technology for model refinement and data storage over the Internet. The network system 600 includes a data gateway and collection/analytics server 630, which can provide feedback directly to the bottling process or user immediately regarding bottle sensor data 611 and bottling line defect detection data 621 and can collect and store this same data for future use. The data collection and analytics server can combine the data from these two sources for more detailed predictive model creation and better prescriptive analytics for packaging line user recommendations.

The data collection and analytics server 630 evaluates the bottle sensor data 611 and scanner bottling line defect detection data 621 to detect potential faults in equipment and/or raw materials in the bottling line systems, and allows for both automatic and user-initiated processes to resolve the faults, and increase efficiency. In a certain embodiment, the data gateway and collection/analytics server 630 may, for example, upon detecting a fault in the bottling line system, automatically transmit a process setting adjustment command to the bottling line system allowing for an automatic line adjustment to correct a fault. In another embodiment, the data collection and analytics server 630 may, for example, alert users to potential faults by communicating wirelessly with a user device dashboard 650 and a bottling line set-up, confirmation, troubleshooting owner system 660, which may be part of a cloud computing platform.

The user device dashboard 650 and a bottling line set-up, confirmation, troubleshooting owner 660 system may be computing devices such as personal computers, laptops, PDAs, smartphones, tablets, or any other devices that can be used to communicate with a given network, and may use edge network and/or cloud computing technology. Users may participate in various activities, including using the data in the data collection and analytics server 630 to manually make the recommended bottling line equipment adjustments in response to fault alerts detected by the system. The alerts received by the bottling line set-up, confirmation, troubleshooting owner 660 may also be sent directly to the sensor bottle users. It can also allow the bottling line set-up, confirmation, troubleshooting owner 660 to observe the bottling line as it is being set up, such as capper heads, observe the confirmation run data along with any troubleshooting runs in order to intervene with the personnel responsible for the set ups and adjustments, as necessary. This intervention could be in the form of a text, email, or phone call and could be initiated by the system or a person.

Figure 7:
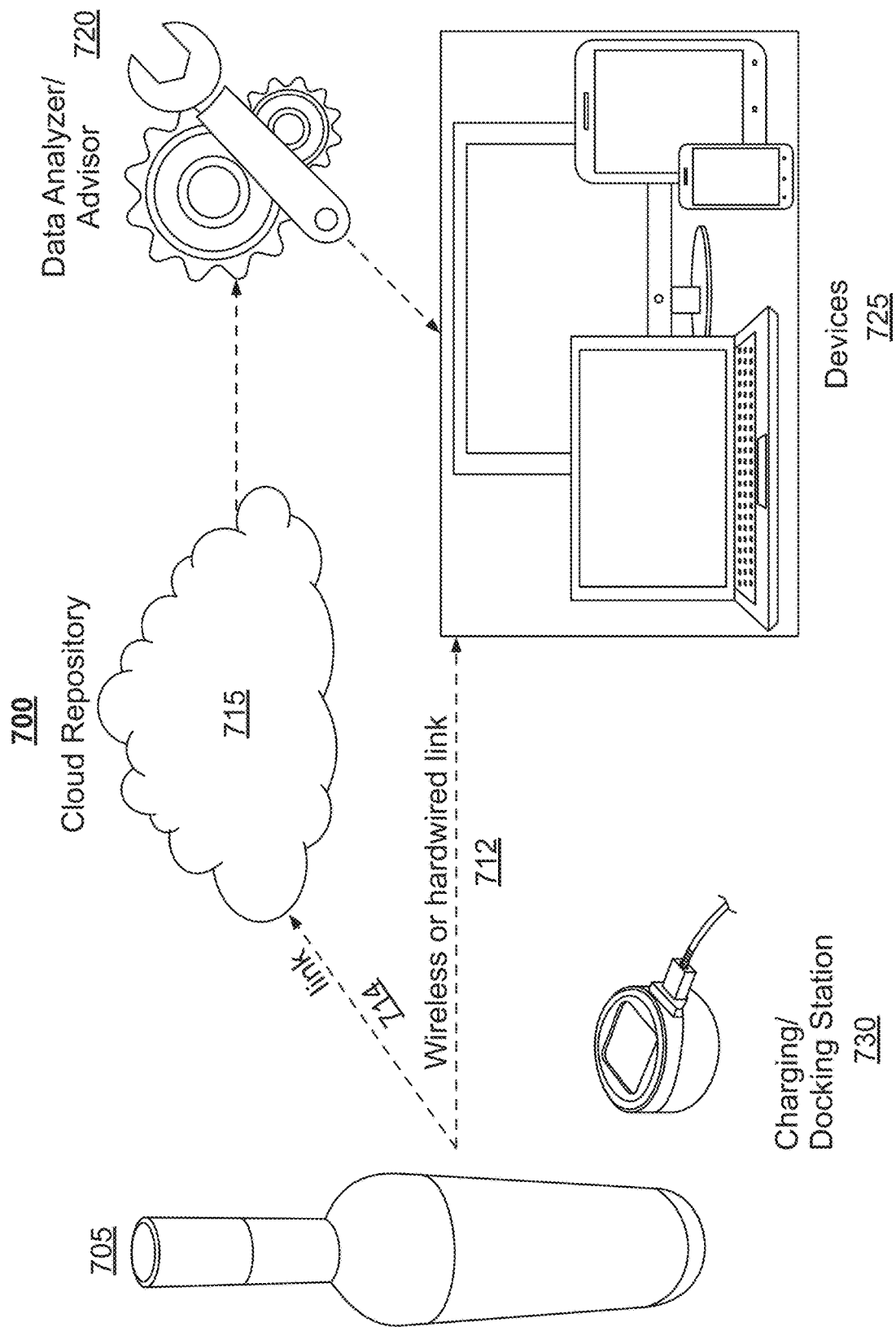
FIG. 7 depicts an exemplary network that collects and analyzes data, according to some embodiments.

FIG. 7 depicts an exemplary network that collects and analyzes data, according to another embodiment. According to one embodiment, system 700 includes a bottle 705, such as the present bottles 110, 210, or 300 that use a communications link 710 (e.g., wired or wireless) to communicate with a gateway 714 and cloud repository 715. According to one embodiment, defect systems (e.g., defect systems 102, 104, 105, 202, 204, 205, etc.) also communicate with a gateway 714 and cloud repository 715 via a communications link 710. In addition, defect systems and bottle 705 may communicate directly with customer data devices 725 through the gateway 714 over a wireless or wired communications link 712. According to another embodiment, customer data devices 725 may be maintained and operated by a third party responsible for deploying bottle 705. A data analyzer server 720 that may reside in the cloud repository 715 analyzes the data stored in the cloud repository that is derived from the present bottle 705. The data analyzer server 720 communicates with customer data devices 725, which may include personal computers, laptops, PDAs, smartphones, tablets, or any other devices that can be used to communicate with a given network, and may use edge network and/or cloud computing technology. The present bottle 705 also may be charged using charging/docking station 730.

Figure 8:
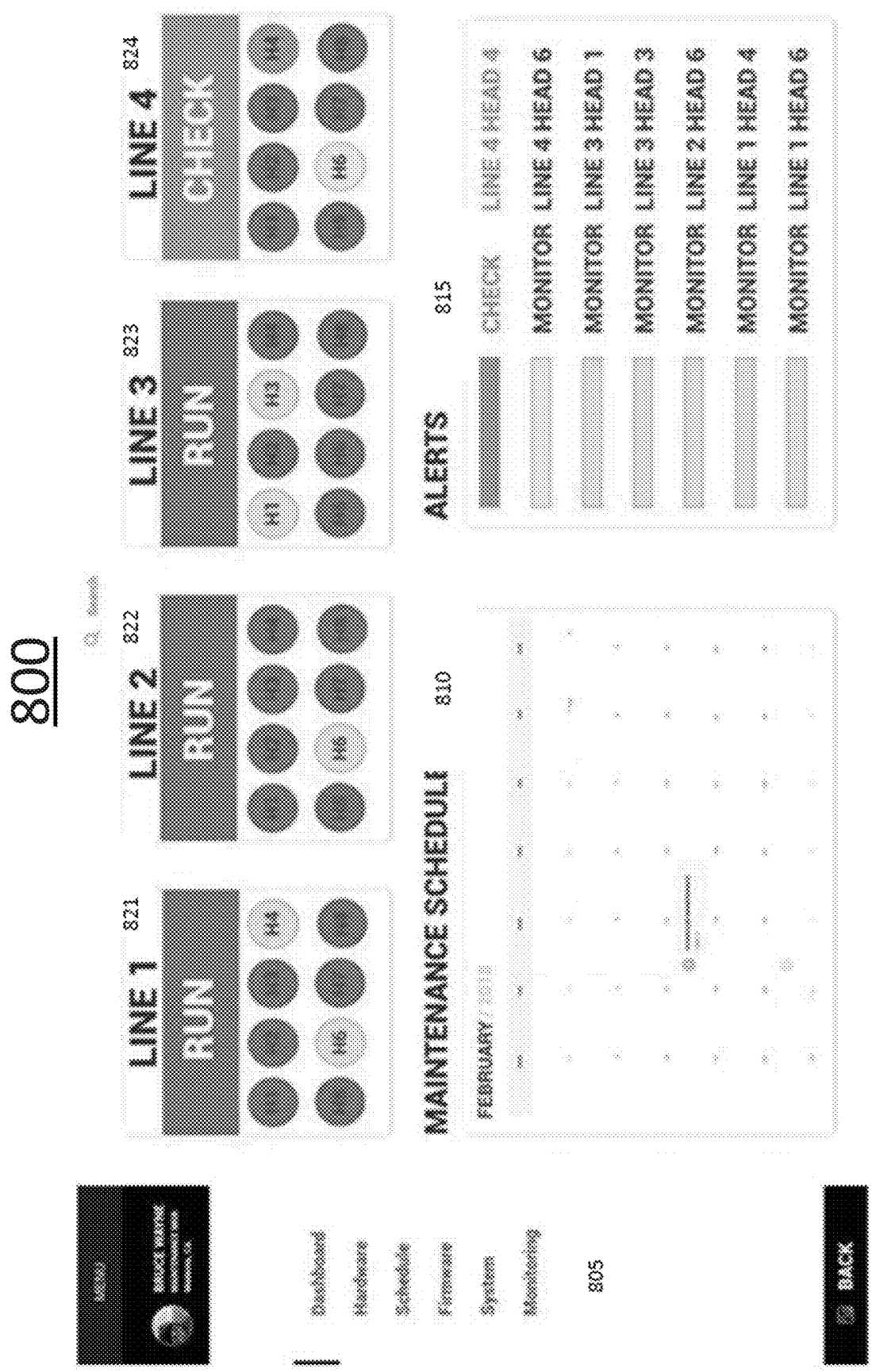
FIG. 8 depicts an exemplary graphical user interface that allows a user to manage a bottling system, according to some embodiments.

FIG. 8 depicts an exemplary graphical user interface that allows a user to manage a bottling system, according to one embodiment. The exemplary graphical user interface includes dashboard 800, which contains information and data provided by the gateway 714, data analyzer server 720 or data collection and analytics server 630. The data may include bottle sensor data, bottling line defect detection data, and data from process equipment and PLC's. Dashboard 800 includes a number of menus 805, including hardware, schedule, firmware, system, and monitoring. Dashboard 800 further includes status information for four bottling lines 821-824 with color coded status indicators. For example, line 4 may have a problem with head H4. Alerts 815 indicate that the user should check line 4 head 4 and monitor other lines and heads. Dashboard 800 also includes a maintenance schedule 810 for components on the bottling line.

Figure 9:
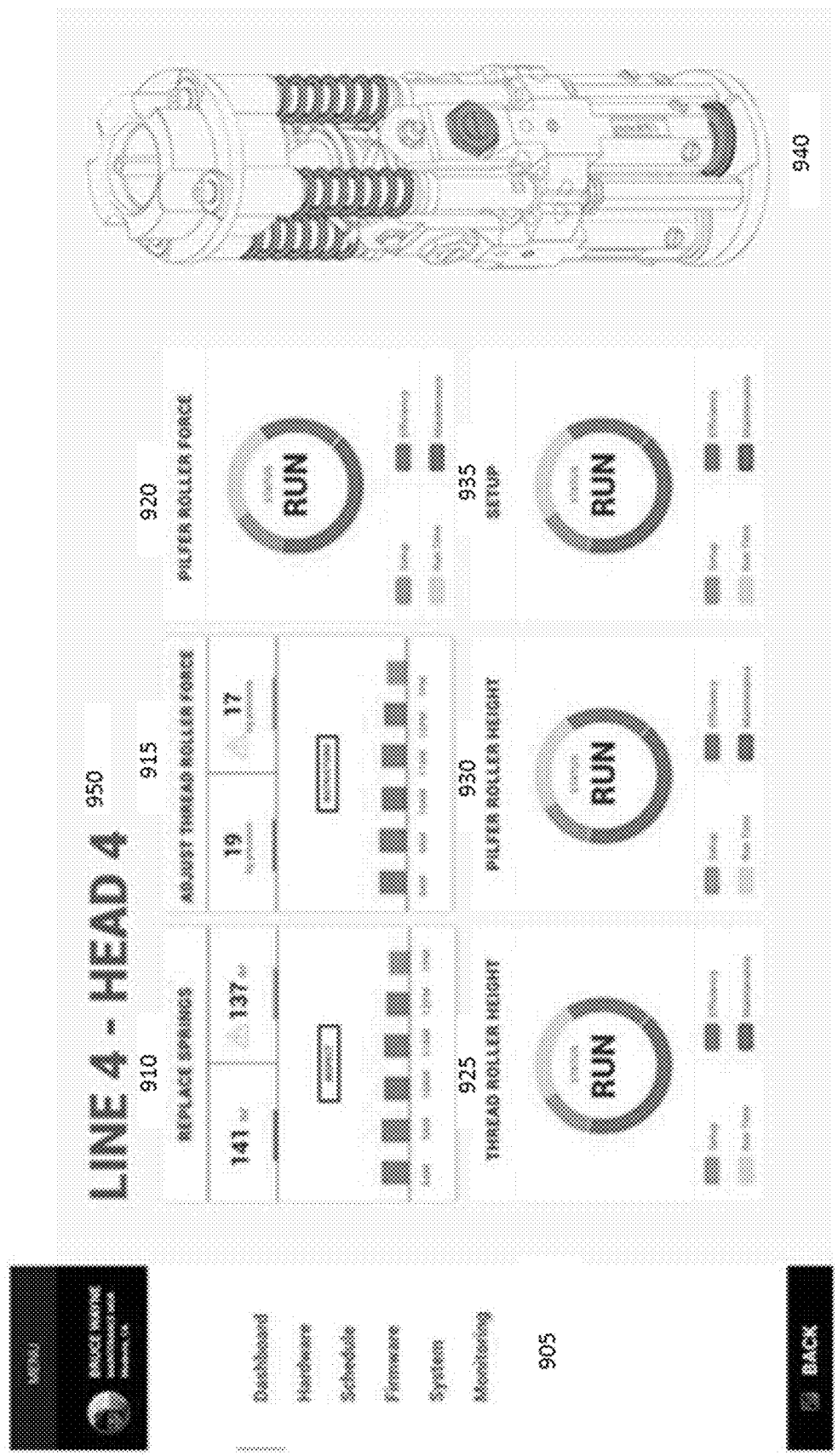
FIG. 9 depicts an exemplary graphical user interface that allows a user to monitor a bottling system's performance, according to some embodiments.

FIG. 9 depicts an exemplary graphical user interface that allows a user to monitor a bottling system's performance, according to one embodiment. The exemplary graphical user interface includes dashboard 900, which includes a menu 905 with information regarding hardware, schedule, firmware, system and monitoring. Dashboard 900 provides detail for a problem 950 located on line 4, head 4. The dashboard communicates that there are two issues with head 4 on line 4. The top load needs to be adjusted 910 from 137 to 141 pounds and the thread roller force needs to be adjusted 915 from 17 to 19 pounds. The dashboard includes a diagram of the capper head 940 highlighting the screw that needs to be moved to adjust the thread roller force and the potentially problematic springs that should be examined and possibly replaced. The dashboard 900 indicates that other parameters are working within acceptable parameters, such as pilfer roller force 920, thread roller height 925, and pilfer roller height 930.

In addition to the information illustrated in dashboards 800 and 900, the present system can determine whether bottling line systems are functioning within an acceptable operating range. For example, as discussed above, the present bottle can measure the top load applied by capper system 160 (e.g., force sensor 373) and data analyser 720 feeds the top load data into predictive models that can inform the appropriate users if the product quality is likely to move outside of acceptable range. The gateway 714 can compare the top load force against a recommended top load value to alert an appropriate user whether the force is within an acceptable operating range (e.g., within 5% of the recommended value). A dashboard may be used to inform the user whether the measurement is within the operating range. This approach can be used with any of the sensor data generated from the sensor bottles 300, 400, 500 or 705.

Figure 10:
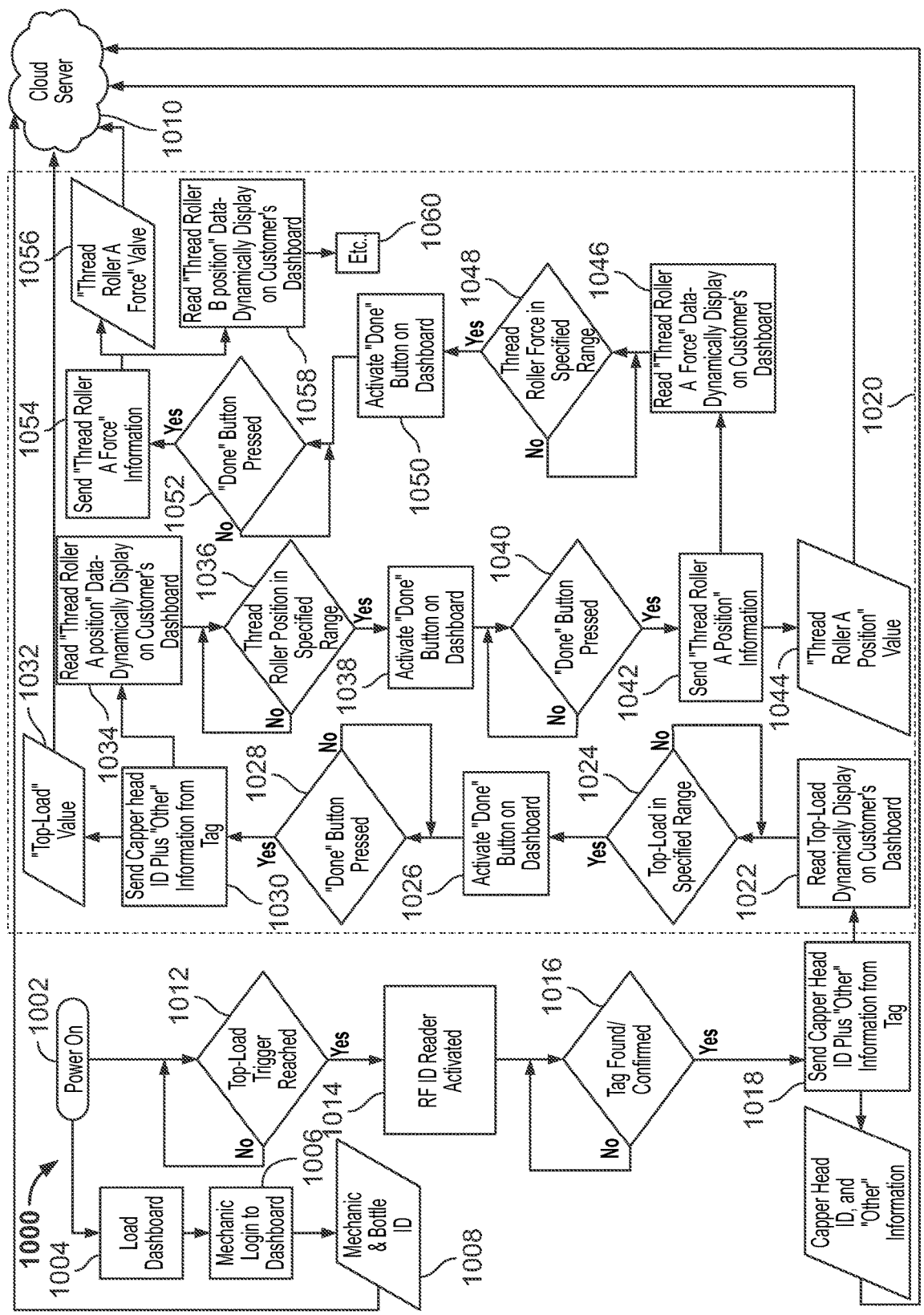
FIG. 10 depicts a flow chart of an exemplary method for performing a setup procedure, according to some embodiments.
Figure 11:
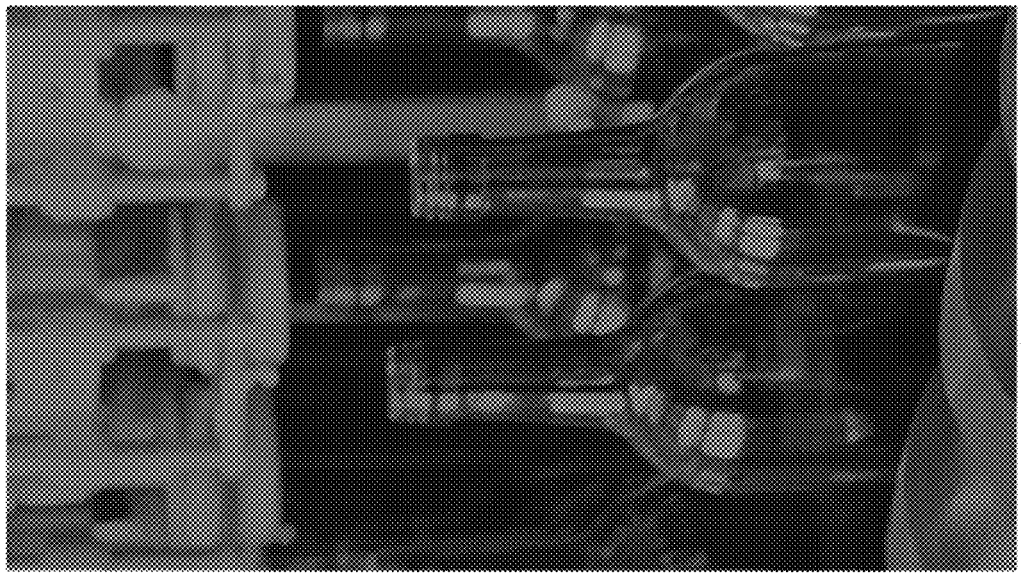
FIG. 11 depicts an exemplary graphical user interface that allows a user to sign-in to a dashboard, according to some embodiments.
Figure 11:
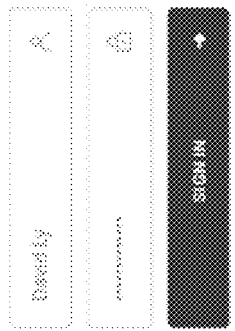

FIG. 10 depicts a flow chart of an exemplary method for performing a setup procedure, according to some embodiments. Setup procedure 1000 begins when a user (e.g., a mechanic) powers on the system at 1002. A dashboard may be loaded for the user on their respective user device at 1004. According to some embodiments, a first screen of the dashboard may include a login screen such as graphical user interface 1100 of FIG. 11 (discussed below), which allows a user to login to the dashboard at 1006.

Once the user is logged in, the dashboard may display to the user high-level information (e.g., mechanic information, bottle IDs) at 1008, such as graphical user interface 1200 of FIG. 12 (discussed below), which allows a user to select the desired hardware. Upon interacting with the graphical user interface, the user device may transmit the high-level information to the cloud server 1010 to generate a details dashboard, which displays more information about the user's selection, such as that provided by graphical user interface 1300 of FIG. 13 (e.g., details dashboard 1302 discussed below).

Setup procedure 1000 further includes a top-load trigger as shown at 1012. Once the user adjusts the bottle's capper head to apply the necessary top-load force as indicated by the details dashboard, the top-load trigger is reached at 1012 and an RFID reader (e.g., RFID reader 393) may be activated at 1014. Once an RFID tag is identified by the RFID reader at 1016, information from said RFID tag is transmitted to a cloud server 1010 (e.g., data gateway and collection/analytics server 362) at 1018.

Setup procedure 1000 further includes a data confirmation procedure 1020, according to some embodiments. Data confirmation procedure 1020 includes reading sensor data from each available sensor of the bottle and displays said data in the associated sensor subpanel of details dashboard (e.g., details dashboard 1302 discussed below), according to some embodiments. For example, data confirmation procedure 1020 includes reading top-load data from the bottle at 1022 and displaying it in a top-load sensor subpanel of details dashboard for the user to read. The user may make adjustments to the top-load value until the sensor data indicates it is within a specified range at 1024.

Once the top-load sensor achieves the specified range, the done button of the associated sensor subpanel may be activated at 1026, indicating that the user may select the button. The user may press the activated done button at 1028. According to some embodiments, when a user presses an activated done button on details dashboard (e.g., details dashboard 1302 discussed below), the specific sensor reading along with the capper head ID plus other information stored in the RFID tag is transmitted to the cloud server 1010 at 1030. According to some embodiments, pressing the done button of the sensor subpanel associated with the top-load sensor will transmit to the cloud server 1010 the top-load data 1032 received from the top-load sensor. According to some embodiments, data confirmation procedure 1020 repeats the procedures as described above for other sensors available on the bottle. For example, data confirmation procedure 1020 further includes reading thread roller position data from the bottle at 1034 and displaying it in a thread roller position subpanel of details dashboard for the user to read. The user may make adjustments to the thread roller position until the sensor data indicates it is within a specified range at 1036.

Once the thread roller position sensor achieves the specified range, the done button of the associated sensor subpanel may be activated at 1038, indicating that the user may select the button. The user may press the activated done button at 1040. According to some embodiments, pressing the done button of the sensor subpanel associated with the thread roller position sensor will transmit at 1042 thread roller position data 1044 received from the thread roller position sensor to the cloud server 1010.

According to some embodiments, data confirmation procedure 1020 may proceed to read additional data from the bottle, such as thread roller force data at 1046 and displaying it in a thread roller force subpanel of details dashboard for the user to read. The user may make adjustments to the thread roller force until the sensor data indicates it is within a specified range at 1048.

Once the thread roller force sensor achieves the specified range, the done button of the associated sensor subpanel may be activated at 1050. The user may press the activated done button at 1052. According to some embodiments, pressing the done button of the sensor subpanel associated with the thread roller force sensor will transmit at 1054 the thread roller force data 1056 received from the thread roller force sensor to the cloud server 1010.

According to some embodiments, data confirmation procedure 1020 repeats the procedures as described above for each of the other available sensors on the bottle (e.g., data from other thread roller sensors, data from pilfer roller sensors, etc.). According to some embodiments, at any time during setup procedure 1000, the user can press one or more abort buttons provided by details dashboard to end the set-up procedure 1000 for a particular capper head. According to some embodiments, when an abort button is pressed, a time and date stamped with a message indicative of the button selection is sent to cloud server 1010.

As described above, FIG. 11 depicts an exemplary graphical user interface that allows a user to sign in to a dashboard, according to some embodiments.

Figure 12:
FIG. 12 depicts an exemplary graphical user interface that allows a user to select hardware including selecting desired hardware for specific tasks, according to some embodiments.

FIG. 12 depicts an exemplary graphical user interface that allows a user to select hardware, according to some embodiments. FIG. 12 illustrates a graphical user interface 1200 which displays hardware panel 1202 containing one or more subpanels of information, each associated with a bottle in the system, according to some embodiments. Hardware panel 1202 includes subpanel 1204 associated with a particular hardware. According to some embodiments, subpanel 1204 may include a button 1206 that, when activated by the user, generates a new graphical user interface 1300 as shown in FIG. 13.

Figure 13:
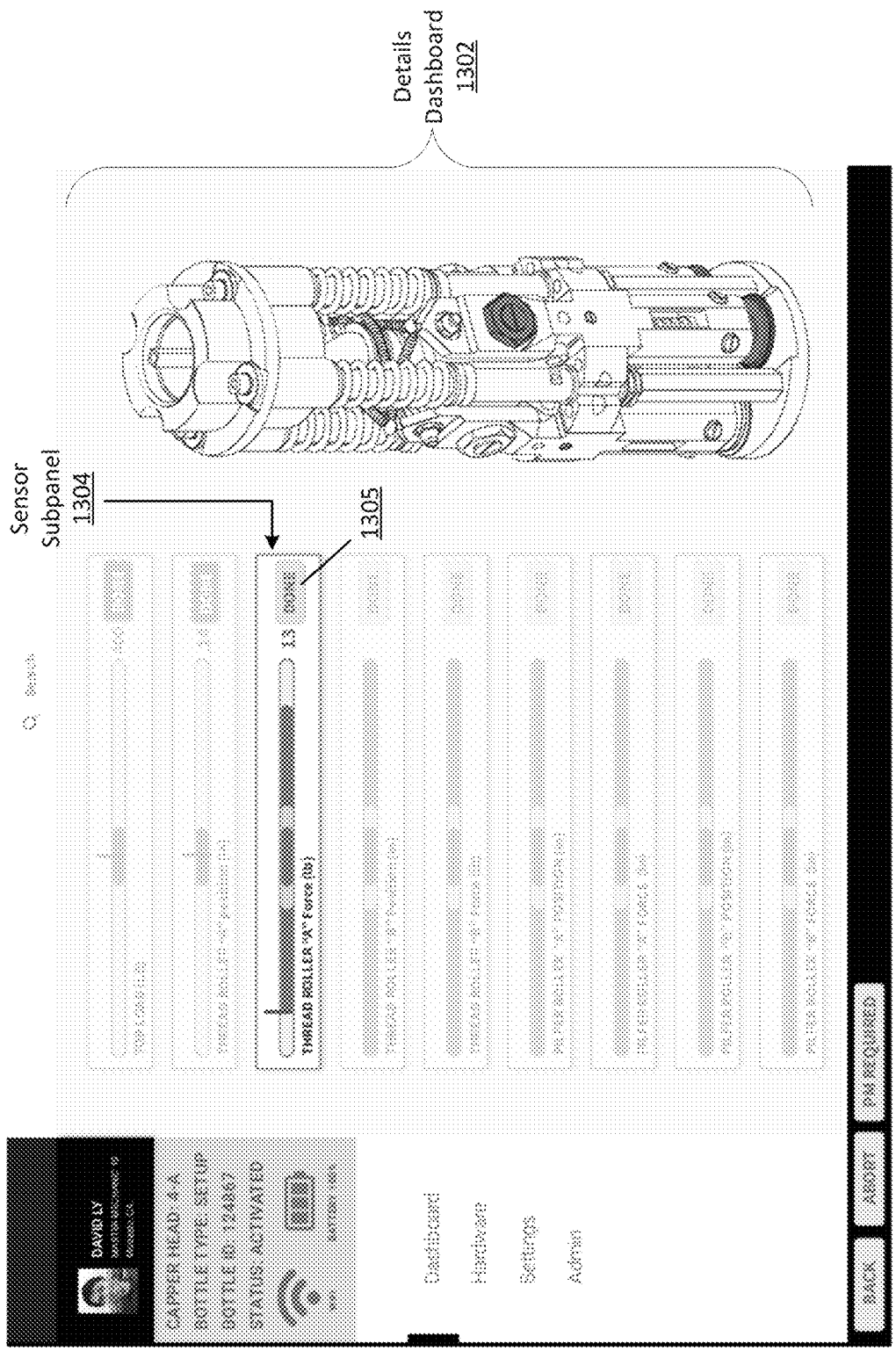
FIG. 13 depicts an exemplary graphical user interface that allows a user to interact with hardware, according to some embodiments.

FIG. 13 depicts an exemplary graphical user interface that allows a user to interact with hardware, according to some embodiments. The graphical user interface 1300 of FIG. 13 includes details dashboard 1302. According to some embodiments, details dashboard 1302 includes a sensor subpanel for each sensor data point received from the bottle.

For example, sensor subpanel 1304 displays a live reading from the Thread Roller "A" Force sensor. Sensor subpanel 1304 may include a representation of the sensor range (e.g., displayed as a color scale in FIG. 13). Sensor subpanel 1304 may also include a done button 1305, according to some embodiments. Done button 1305 remains deactivated until the data displayed in sensor subpanel 1304 falls within a specified range.

Figure 14:
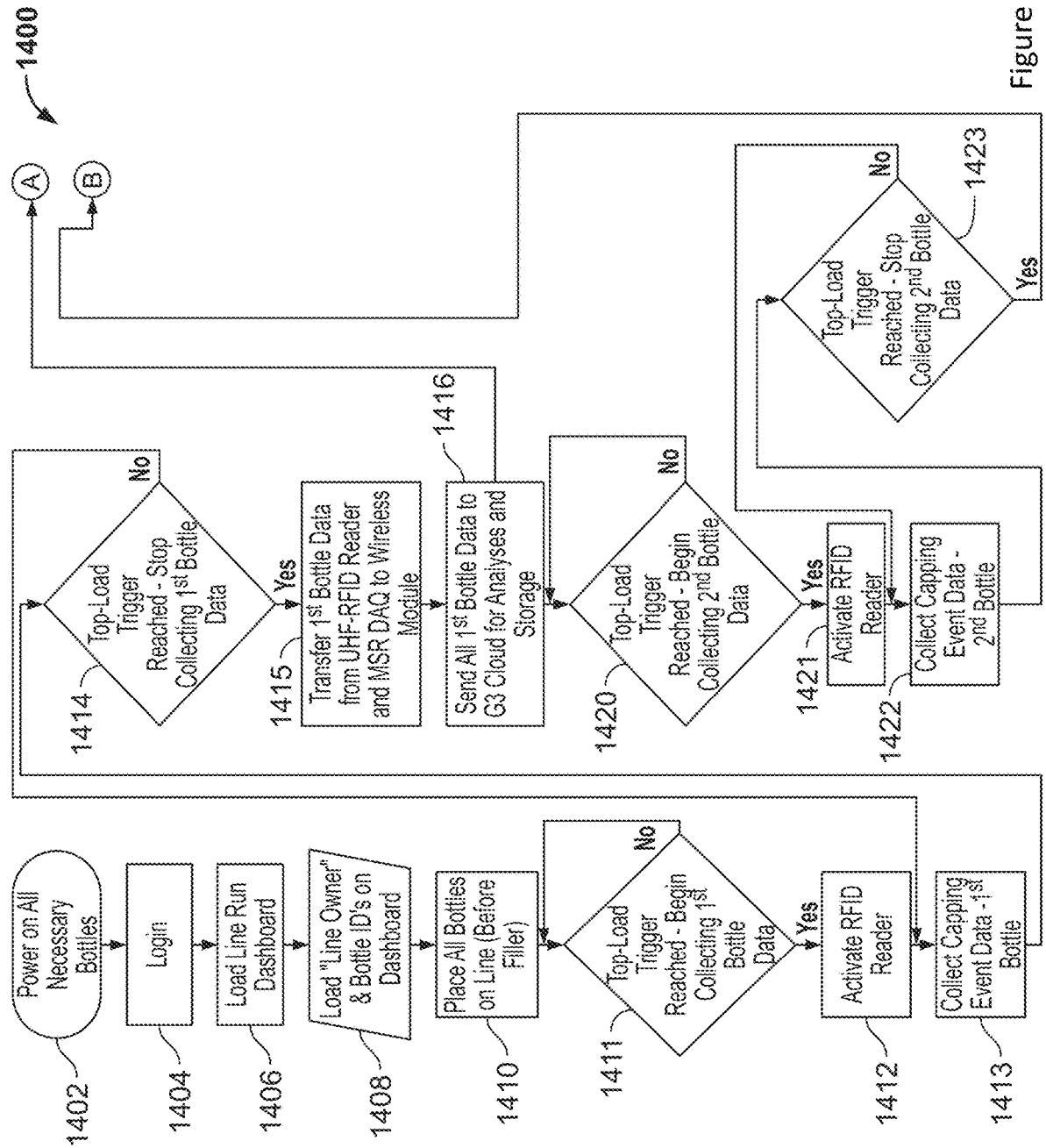
FIG. 14 depicts a flow chart of an exemplary method for performing a bottling line check procedure, according to some embodiments.

FIG. 14 depicts a flow chart of an exemplary method for performing a bottling line check procedure, according to some embodiments. Bottling procedure 1400 includes a user powering on all necessary bottles at 1402 and logging in through the login page (e.g., FIG. 11) at 1404 using an HMI (human machine interface—e.g., a tablet, laptop, or another human interfaceable device). According to some embodiments, once the user loads a dashboard to run the bottling line at 1406, the user may then identify the line owner of this particular bottling line to the dashboard, along with an indication of each bottle's Bottle ID. Bottling procedure 1400 further includes placing bottles on the bottling line at 1410. Once a top-load trigger has been reached for a first bottle at 1411, data from the first bottle may start being collected. To collect data from the first bottle, the first bottle's RFID reader may be activated at 1412. Data from the first bottle may be collected at 1413, the data including capping event data, according to some embodiments. Once another top-load trigger has been reached for the first bottle at 1414, data from the first bottle may stop being collected. Data from the first bottle may be transferred from UHF RFID reader and MSR DAQ to the wireless module at 1415. Data from the first bottle may then be sent at 1416 for analysis and storage on cloud storage 1440.

Bottling procedure 1400 proceeds to gather and transmit data for each bottle in the bottling line. For example, once a top-load trigger has been reached for a second bottle at 1420, data from the second bottle may start being collected. To collect data from the second bottle, the second bottle's RFID reader may be activated at 1421. Data from the second bottle may be collected at 1422, the data including capping event data, according to some embodiments. Once another top-load trigger has been reached for the second bottle at 1423, data from the second bottle may stop being collected. Data from the second bottle may be transferred from UHF RFID reader and MSR DAQ to the wireless module at 1424. Data from the second bottle may then be sent at 1425 for analysis and storage on cloud storage 1440.

Procedure 1400 further includes executing procedures for a third bottle in the bottling line as shown in FIG. 14. For example, once a top-load trigger has been reached for a third bottle at 1430, data from the third bottle may start being collected. To collect data from the third bottle, the third bottle's RFID reader may be activated at 1431. Data from the third bottle may be collected at 1432, the data including capping event data, according to some embodiments. Once another top-load trigger has been reached for the third bottle at 1433, data from the third bottle may stop being collected. Data from the third bottle may be transferred from UHF RFID reader and MSR DAQ to the wireless module at 1434. Data from the third bottle may then be sent at 1435 for analysis and storage on cloud storage 1440. As described above, procedure 1400 further includes executing procedures as described above for each sensor bottle in the bottling line as indicated at 1438.

Upon receiving bottling data at cloud storage 1440, procedure 1400 further includes checking data values against a stored specification. According to some embodiments, the stored specification may provide a range of predetermined values for each sensor. Procedure 1400 may include determining at 1444 whether data values from the bottling data fall within the range of acceptable values provided by the stored specification. If a data value is within the specification, procedure 1400 populates the user dashboard at 1446 with the associated bottling line ID, as well as the data value of the associated sensor displayed as an indication that the data is in the specification. According to some embodiments, indicating that data is in the specification may include displaying the data value in a green font, bolding the data value, or otherwise clearly marking the data value as an in-specification value. If a data value is not within the specification, procedure 1400 still populates the user dashboard at 1448 with the associated bottling line ID, as well as the data value of the associated sensor displayed as an indication that the data is out of the specification. According to some embodiments, indicating that data is out of the specification may include displaying the data value in a red font, bolding the data value, or otherwise clearly marking the data value as an out-of-specification value.

Figure 15:
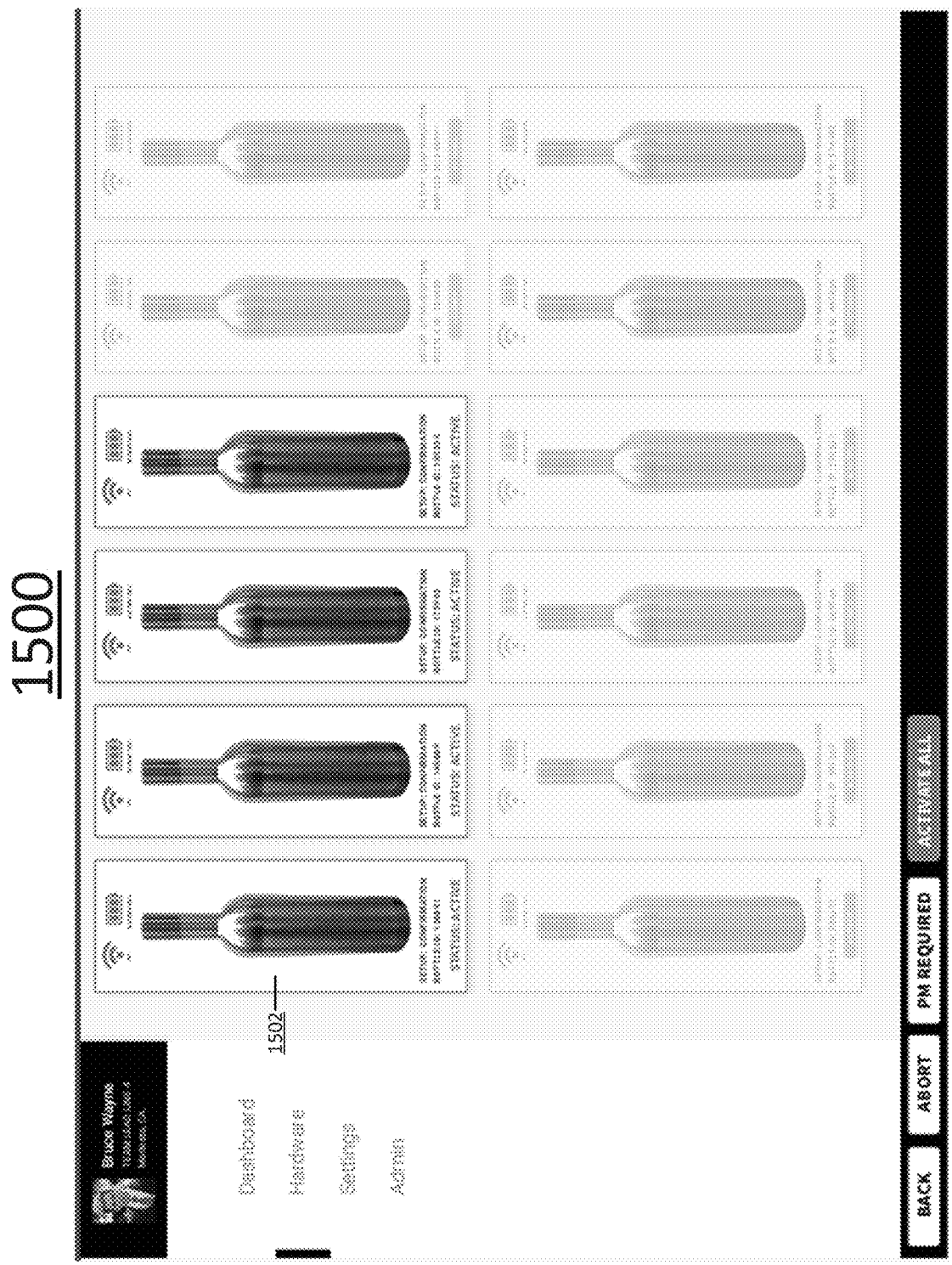
FIG. 15 depicts an exemplary graphical user interface that allows a user to interact with hardware including selecting desired hardware for specific tasks, according to some embodiments.

FIG. 15 depicts an exemplary graphical user interface that allows a user to select hardware to use on the bottling line, according to some embodiments. According to some embodiments, this user may be considered a "manager" that uses graphical user interface 1500 to select bottles for particular bottling lines in order to generate data from these lines. After selecting the sensor bottles (e.g., 1502) displayed on graphical user interface 1500, a user (e.g., "manager") may run the selected sensor bottles on the bottling line and be presented with a second graphical user interface 1600 as shown in FIG. 16(*a*).

Figure 16A:
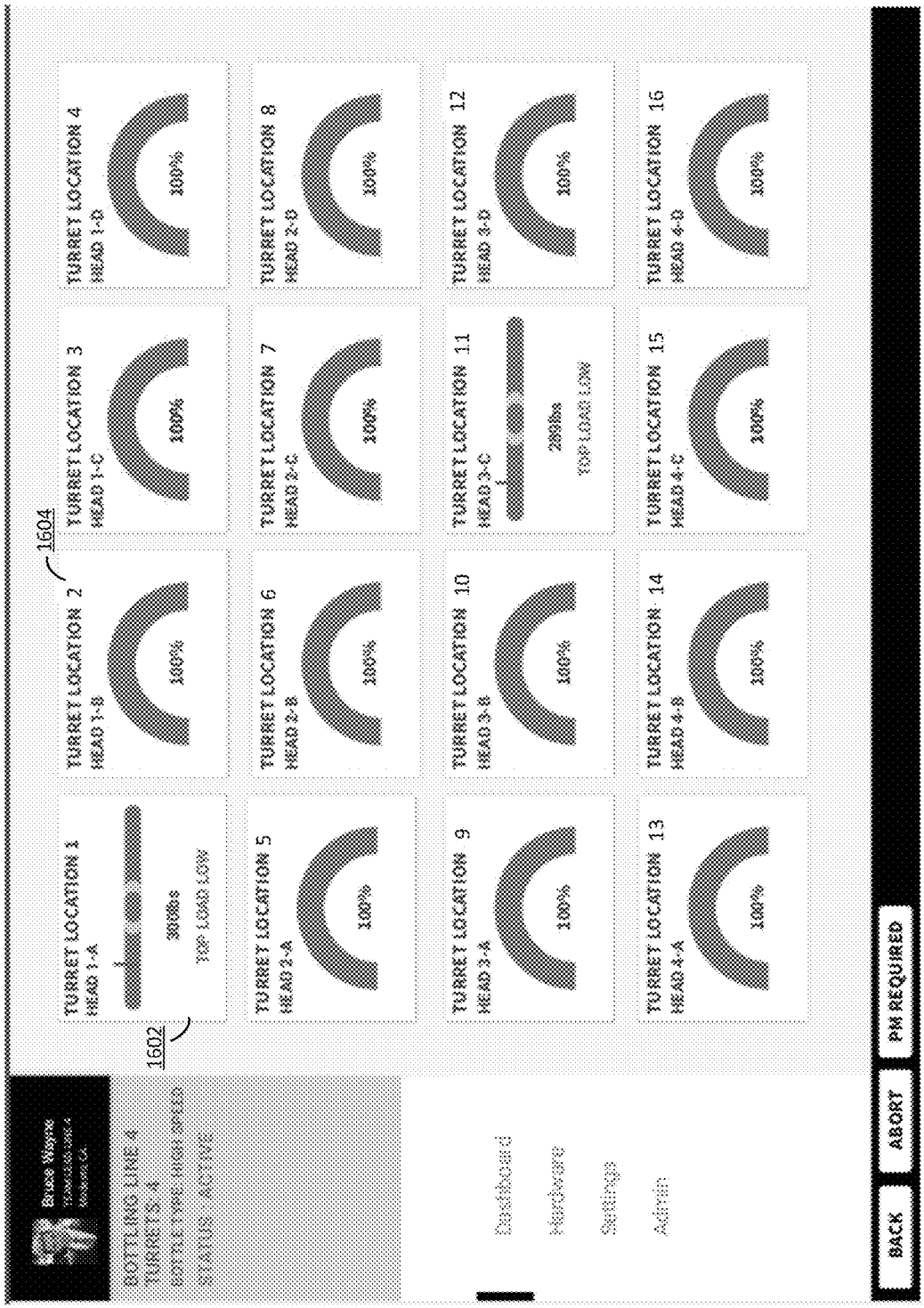
FIG. 16(a) depicts an exemplary graphical user interface that allows a user to monitor a bottling system's performance, according to some embodiments.
Figure 16B:
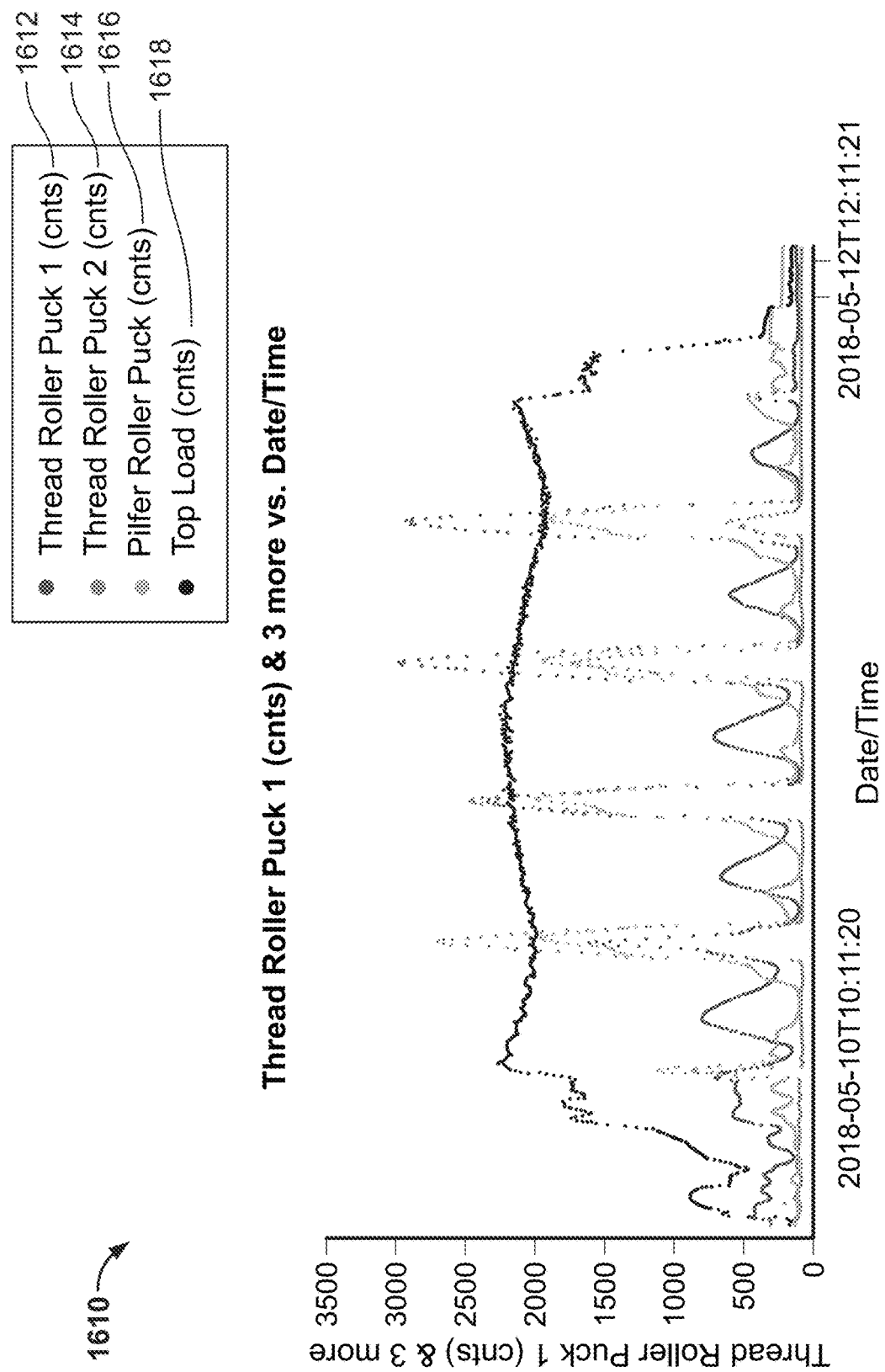
FIG. 16(b) depicts an exemplary graph of data from a bottling procedure, according to some embodiments.

FIG. 16(*a*) depicts an exemplary graphical user interface that allows a user to monitor a bottling system's performance, according to some embodiments. Graphical user interface 1600 displays details regarding the data generated from running the sensor bottles (e.g., 1502) selected by the user on graphical user interface 1500. Graphical user interface 1600 displays the data collected from each bottle during the bottling procedure as outlined in procedure 1400. For example, graphical user interface 1600 displays a visual representation of sensor data in a 4×4 table (e.g., turret location 1 for head 1-A, turret location 2 for head 1-B, turret location 3 for head 1-C, turret location 4 for head 1-D, turret location 5 for head 2-A, turret location 6 for head 2-B, etc.).

Graphical user interface 1600 may display at least two representations of data: in-specification and out-of-specification. According to some embodiments, data that does not fall within a range of predetermined values for each sensor may be displayed as out-of-specification data. According to some embodiments, displaying out-of-specification data may include a red graphic containing the sensor data and a scale indicating how the sensor data compares to the range of predetermined values. For example, data representation 1602 displays turret location 1 for head 1-A as out-of-specification data.

According to some embodiments, data that falls within the range of predetermined values for each sensor may be displayed as in-specification data. According to some embodiments, displaying in-specification data may include a green graphic containing an indication that the sensor data falls within the range of predetermined values for that sensor. For example, data representation 1604 displays turret location 2 for head 1-B as in-specification data. According to some embodiments, graphical user interface 1600 may use other visual representations to display data. For example, data may be displayed on a graph as displayed by FIG. 16(*b*).

FIG. 16(*b*) depicts an exemplary graph of data from a bottling procedure, according to some embodiments. Graph 1610 illustrates data from four (4) sensor bottle hardware components: Thread Roller Puck 1 (1612), Thread Roller Puck 2 (1614), Pilfer Roller Puck (1616), and Top Load (1618). Data from other sources, including other hardware components of the bottling line, may be generated and displayed for the user.

Figure 17:
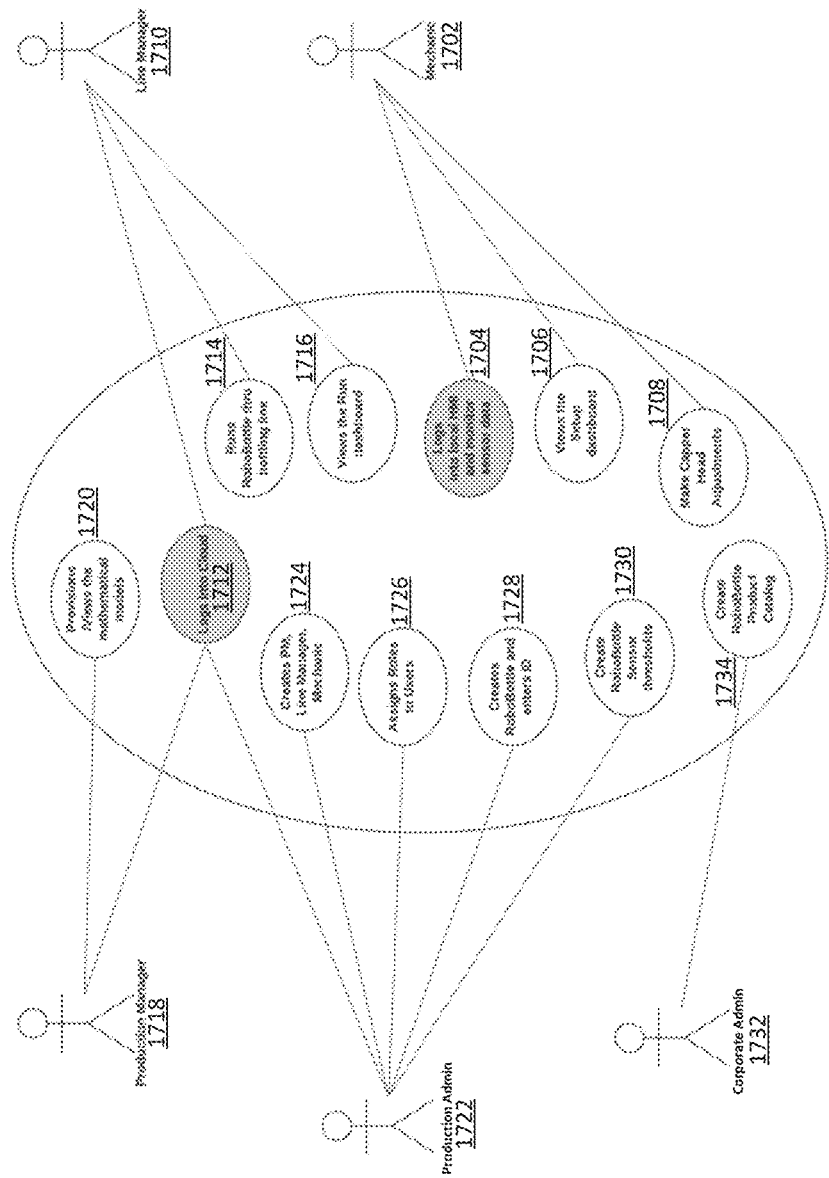
FIG. 17 depicts an exemplary illustration of permissions of various users, according to some embodiments.

FIG. 17 depicts an exemplary illustration of permissions of various users and their associated roles, according to some embodiments. For example, Mechanic 1702 points to three descriptions of activities performed: (1) logging into local HMI and monitoring sensor data at 1704, (2) viewing the setup dashboard at 1706, and (3) making capper head adjustments at 1708, according to some embodiments. Line manager 1710 points to three descriptions of activities performed: (1) logging into the cloud user interface at 1712, (2) running bottles through the bottling line at 1714, and (3) viewing the run dashboard as described above and as shown at 1716. Production manager 1718 points to two descriptions of activities performed: (1) logging into the cloud user interface at 1712, and (2) provisioning/viewing the mathematical models, according to some embodiments. Production administrator 1722 points to five descriptions of activities performed, including: (1) logging into the cloud user interface at 1712, (2) creating user accounts for the various production managers, line managers, and mechanics assigned to the production line at 1724, (3) assigning roles to the new user accounts at 1726, (4) creating bottle representations in the system and entering the bottle ID thereof at 1728, and (5) creating sensor threshold(s) for each bottle at 1730, according to some embodiments. Lastly, corporate administrator 1732 points to: (1) creating a product catalogue for the processed bottles, according to some embodiments.

Figure 18:
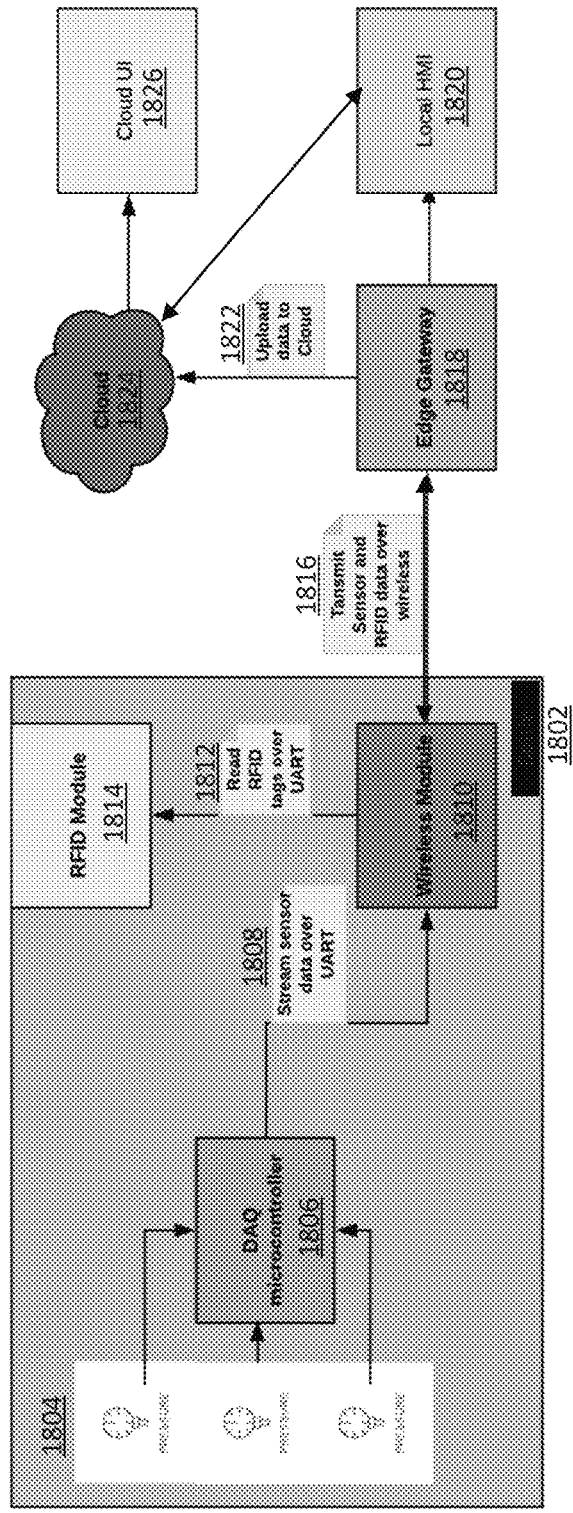
FIG. 18 depicts an exemplary architecture to facilitate data transmission, according to some embodiments.

FIG. 18 depicts the overall architecture for data transmission, according to some embodiments. Architecture 1800 depicts an exemplary embodiment wherein sensor data (e.g., pressure data) is detected and transmitted. According to some embodiments, bottle 1802 includes 3 sensors 1804 that detect pressure. Sensors 1804 may transmit pressure data to a DAQ microcontroller 1806, according to some embodiments. At 1808, the data may be streamed over UART from DAQ microcontroller 1806 to wireless module 1810, according to some embodiments. Once the sensor data is received, the wireless module 1810 may request at 1812 that the RFID module 1814 read data from the bottling line device RFID tag(s) and transmit the data back to wireless module 1810.

After receiving RFID tag data from RFID module 1810, wireless module 1810 may transmit at 1816 the sensor data and RFID tags data over a network (e.g., wireless, wired) to an edge gateway 1818. Edge gateway 1818 transmits this data to one or more data repositories. According to some embodiments, one data repository includes local HMI 1820. Local HMI 1820 may display for the user the data as received from edge gateway 1818 to allow a user to view such data. According to some embodiments, another data repository may include the cloud 1824. For example, edge gateway 1818 may upload data through 1822 to cloud 1824 for further analyses and/or storage. Cloud 1824 may store the data as received in a large database located therein for displaying on cloud UI 1826 and/or Local HMI 1820. In some embodiments, cloud 1824 may further contain predictive models that the data is input in order to display predicted results on cloud UI 1826 and/or Local HMI 1820. These predictive models may be developed using design-of-experiment platforms and/or data mining platforms that leverage decision trees, partial least squares (PLS) logic, and/or artificial neural networks (ANNs).

Figure 19:
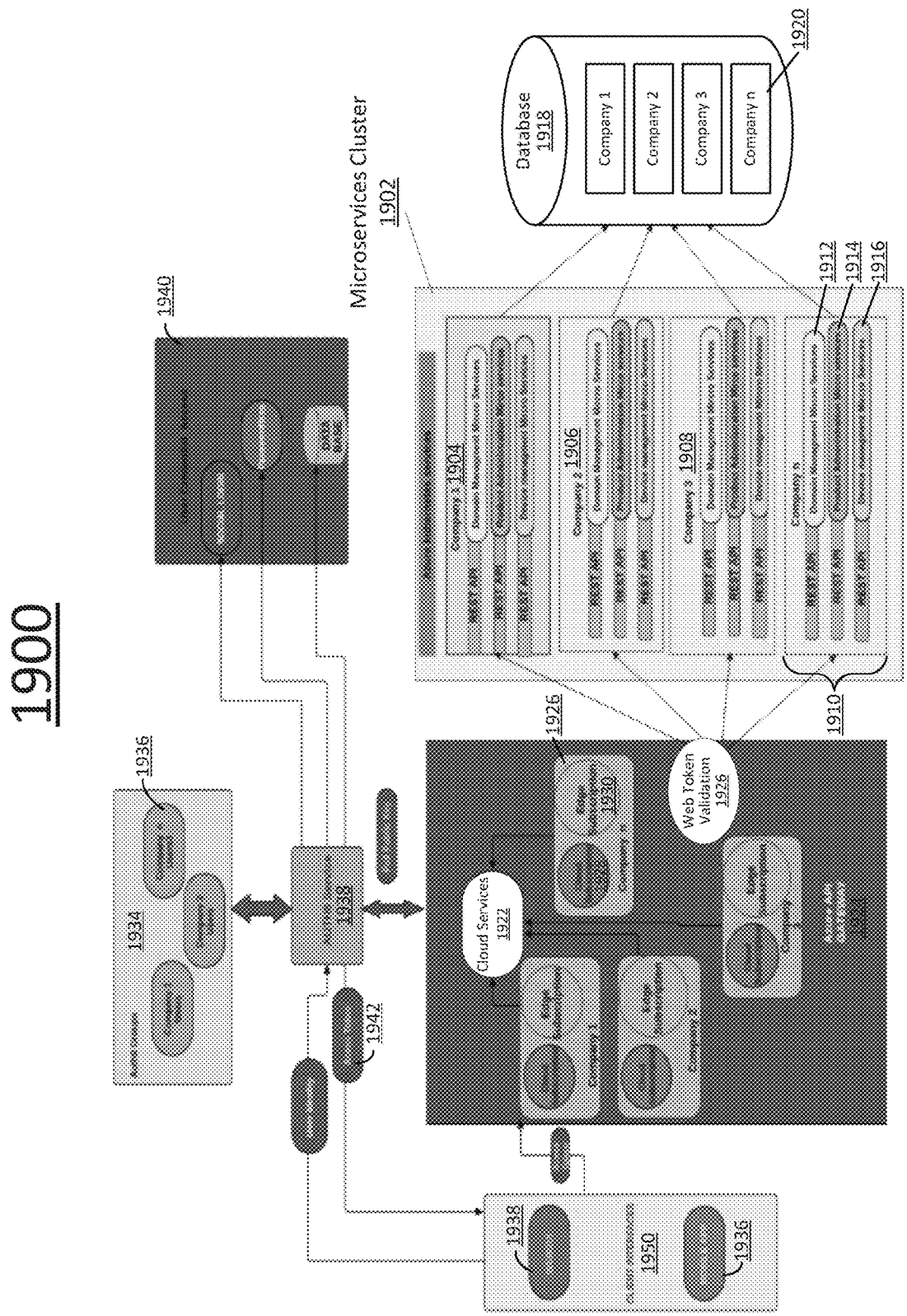
FIG. 19 depicts an exemplary architecture to facilitate a software as a service (SaaS) system, according to some embodiments.

FIG. 19 depicts an exemplary architecture to facilitate a software as a service (SaaS) system for multiple, independent companies, according to some embodiments. For example, architecture 1900 includes Azure microservices cluster 1902, which contains dockers 1904, 1906, 1908, and 1910, each of which may be assigned to a company (e.g., company 1, company 2, company 3, and company n). Each company is hosted in a separate docker namespace under microservices cluster 1902, such as docker 1910.

According to some embodiments, each docker contains microservices. For example, the microservices that makeup docker 1910 (e.g., company n) include, but are not limited to, domain management 1912, product administration 1914, and device management 1916. Domain management microservice 1910 is responsible for the hierarchy of an individual company (e.g., company n). Domain management microservice 1910 is exposed to the client and edge devices, according to some embodiments. Product administration microservice 1912 is responsible for managing administration activities, such as creating companies, company administration accounts, and user accounts, according to some embodiments. Product administration microservices 1914 are executed by way of APIs, according to some embodiments. Device management microservice 1916 is responsible for tracking and facilitating communication with each company's devices (e.g., gateways) across architecture 1900. According to some embodiments, each company's docker may store data in individual collections on a system database. For example, docker 1910 of company n stores data in collection 1920 on database 1918.

According to some embodiments, microservices cluster 1902 may communicate with the cloud services 1922 through API gateway 1924. API gateway 1924 provides each company with an access token used to authenticate the company's docket using web token validation module 1926. For example, by providing web token validation module 1926 with the associated token, docker 1910 is validated by web token validation module 1926 and directed to gateway 1926. Each gateway of API gateway 1924 indicates the company's associated subscriptions that provide access to cloud services 1922. For example, gateway 1926 includes subscription data for company n, including cloud subscription 1928 and edge subscription 1930. Accordingly docker 1910 may communicate with cloud services 1922 through gateway 1926 using edge subscription 1930. Similarly, company users may access cloud services 1922 using their company's associated cloud subscription (e.g., cloud subscription 1928).

Each company's users may be organized into user groups 1934, such as user group 1936 which contains users of company n. According to some embodiments, Auth0 service 1938 may authenticate users according to that user's particular user credentials stored in user credential access 1940.

According to some embodiments Auth0 services 1938 may be used to authenticate users before providing access to a web application, according to some embodiments. The first time a user goes through the flow as provided by architecture 1900, and if client interface 1950 is a third party application, a consent page may be shown to the user where the permissions are listed (e.g., post messages, list contacts). Auth0 services 1938 may redirect users to a client interface 1950 with an access token 1942 in the hash fragment of the URI. According to some embodiments, Auth0 services 1938 may further provide an ID Token in addition to access token

1938. The client interface 1950 may extract the tokens (e.g., access token 1942, ID token) from the hash fragment. The client interface 1950 may then use access token 1942 to call APIs on behalf of the user.

Auth0 services 1938 further ensures that a valid access token 1942 is passed in the HTTP Authorization header when calls are made to the API by a client interface 1950 (e.g., web interface 1952, mobile application 1954). Client interface 1950 may pass the access token 1942 in the HTTP Authorization header when making calls to the API gateway. According to some embodiments, client interfaces 1950 may display UI elements conditionally based on permissions granted to a particular user or a class of users (e.g., as illustrated in FIG. 17).

Figure 20:
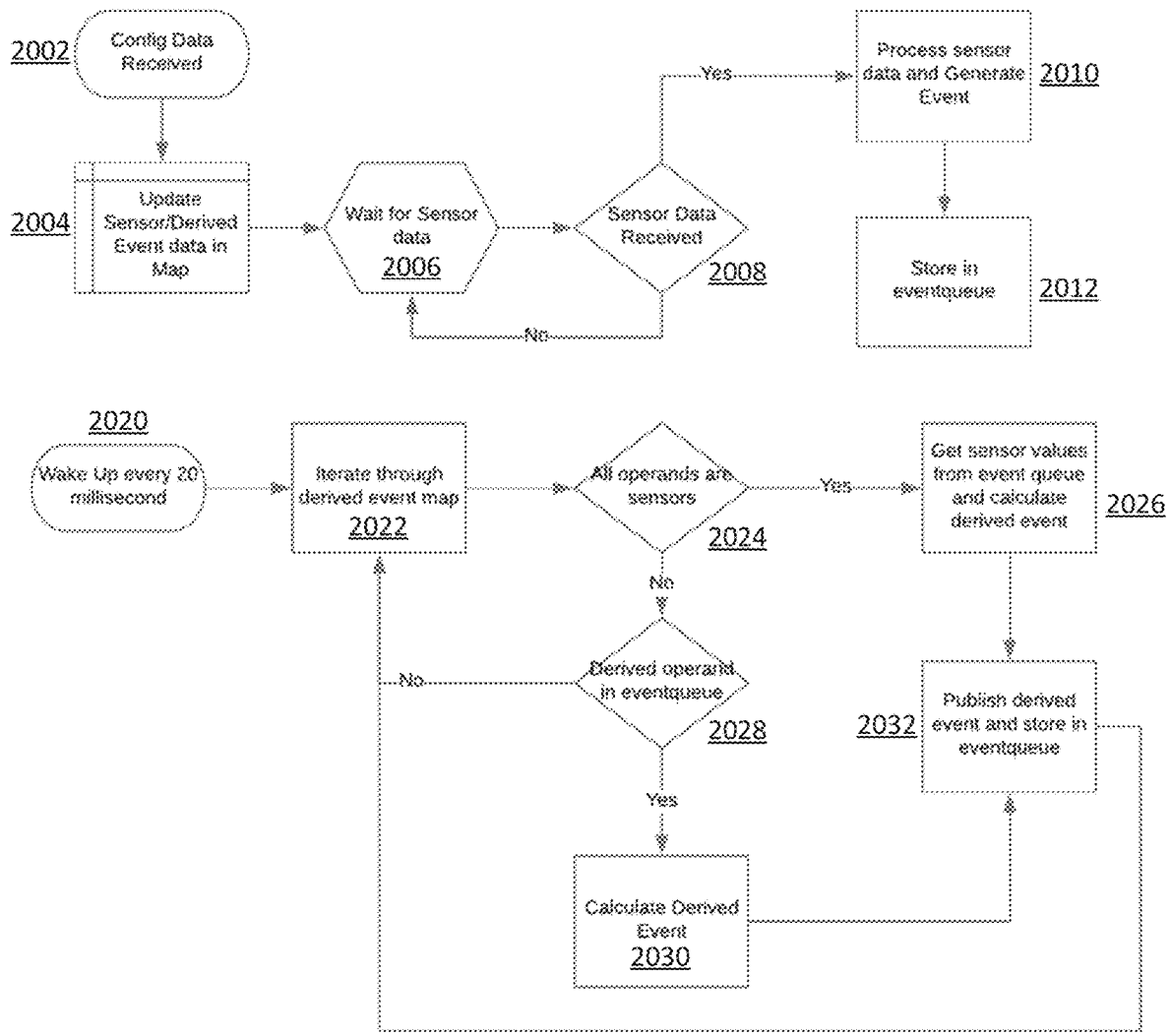
FIG. 20 depicts a flow chart of an exemplary data transmission procedure, according to some embodiments.

FIG. 20 depicts a flow chart of an exemplary data transmission procedure, according to some embodiments. Specifically, flow chart 2000 demonstrates how an event may be generated by a docker. When configuration data is received at 2002, the map may be updated using received sensor data or derived event data at 2004, according to some embodiments. After a continuous waiting period for sensor data at 2006, sensor data may be received at 2008. Once received, the sensor data may be processed and a new event may be generated as shown at 2010, according to some embodiments. The data and newly generated event may then be stored in an eventqueue at 2012, according to some embodiments. Flow chart 2000 further comprises a procedure that repeats over a particular period (e.g., every 20 milliseconds) as shown at 2020. At 2022, the derived event map is iteratively processed. If all operands of the derived event map are determined to be sensors at 2024, sensor values are retrieved from the event queue and derived events are calculated at 2026. Otherwise, if any derived operands are detected in the eventqueue at 2028, a derived event is calculated therefrom at 2030. Derived event data is then published and stored in eventqueue at 2032.

Figure 21:
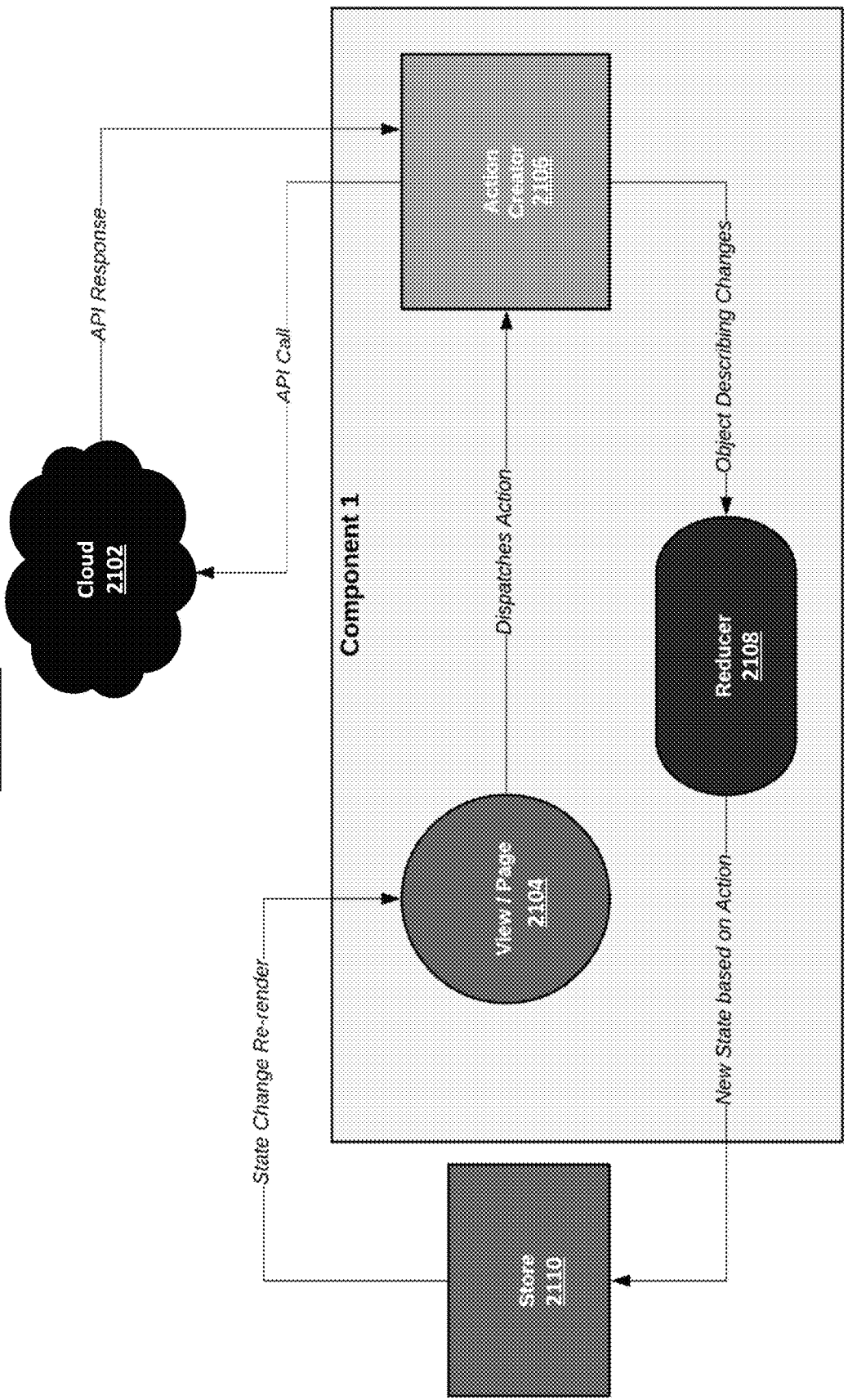
FIG. 21 depicts an exemplary architecture of a single component used to facilitate a user interface, according to some embodiments.

FIG. 21 depicts an exemplary architecture of a single component (e.g., component 1) used to facilitate a user interface (UI), according to some embodiments. Architecture 2100 demonstrates how the modules of a single component facilitates a user interface by various states. In response to a user generating an event using view/page module 2104, component 1 may request that an action be performed by transmitting an API call to cloud 2102. Cloud 2102 generates an API response, which is transmitted back to action creator 2106. After receiving the response, action creator 2106 notifies reducer 2108 data indicative of changes to be made. Reducer 2108 updates store 2110 to the new state based on the changes received at reducer 2108. As such, store 2110 updates the states of component 1 which, in turn, displays the updates via view/page module 2104.

Figure 22:
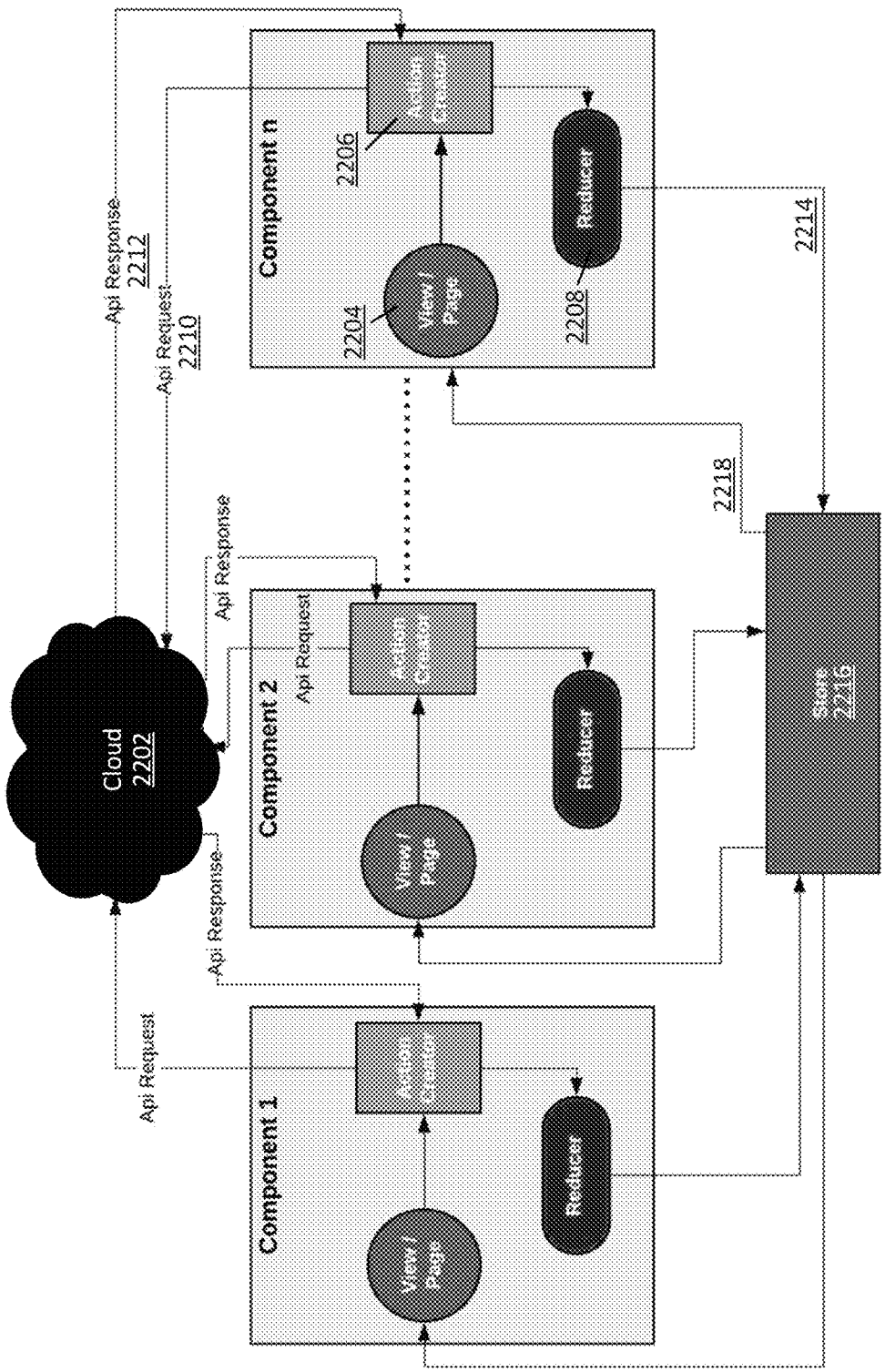
FIG. 22 depicts an exemplary architecture of a plurality of components used to facilitate a user interface, according to some embodiments.

FIG. 22 depicts an exemplary architecture of a plurality of components used to facilitate a user interface, according to some embodiments. Architecture 2200 facilitates communication between cloud 2202 and a number of UI components (e.g., component 1, component 2, component n), each component having its own state and associated modules to control the state. For example, component n comprises a view/page module 2204, action creator module 2206, and reducer 2208. In response to a user generating an event using view/page module 2204, component n may use action creator 2206 to transmit an API request 2210 to cloud 2202. Cloud 2202 generates an API response 2212, which is transmitted back to action creator module 2206 of component n. After receiving the response, action creator 2206 notifies reducer 2208 to transmit an update 2214 to store 2216 accordingly. As such, store 2216 contains record of the states for each component (e.g., component 1, component 2, component n). According to some embodiments, store 2216 may transmit the updated state 2218 to display on view/page module 2204 for the user. As shown in architecture 2200, each component is in charge of managing its own state. In some embodiments, a component may influence or otherwise update the state of another component.

Figure 23:
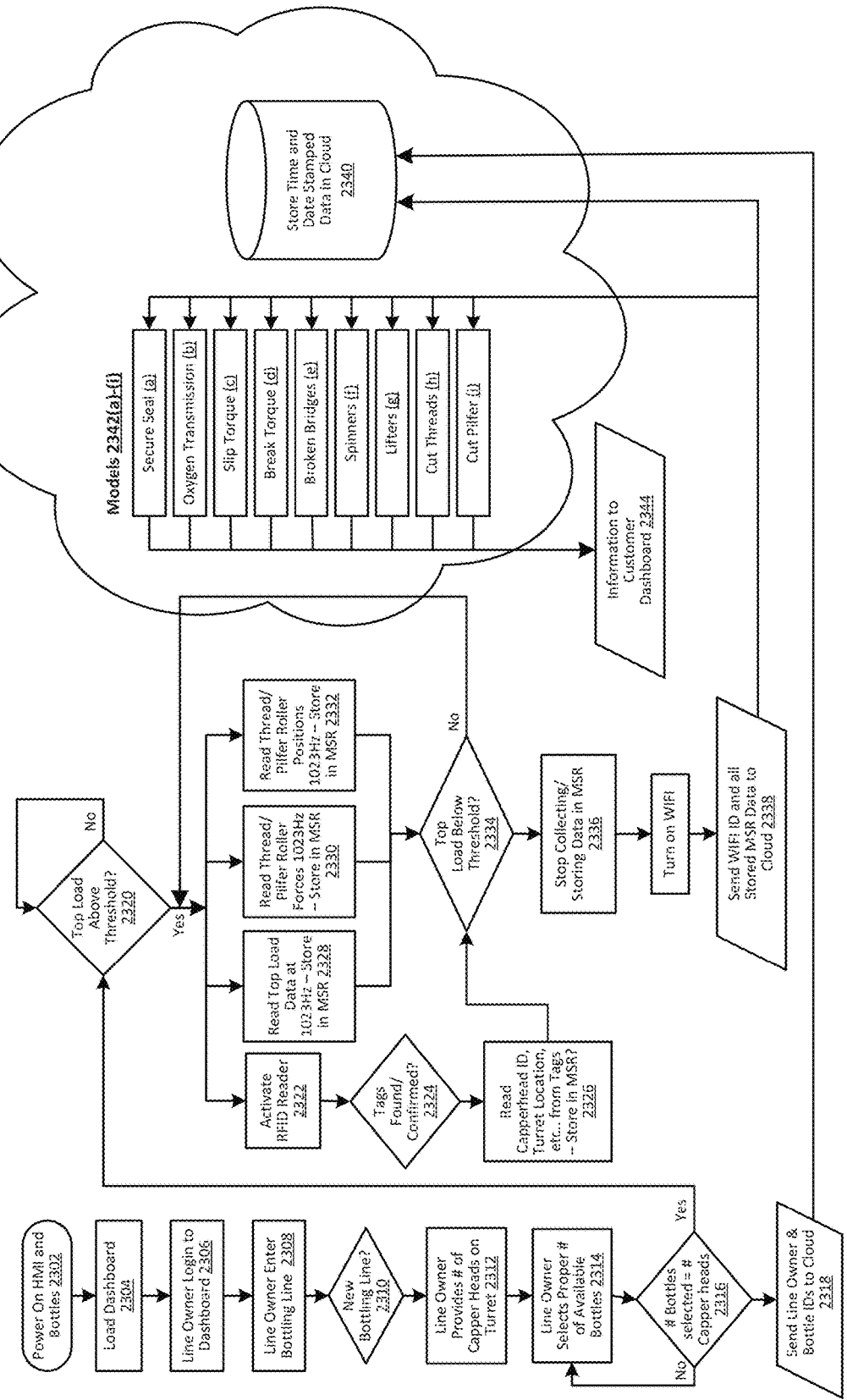
FIG. 23 depicts a flow chart of a sensor bottle being deployed in a bottling line system, according to some embodiments.

FIG. 23 depicts a flow chart of sensor bottles being deployed in a bottling line system, according to some embodiments. Flow chart 2300 includes powering on a HMI (human machine interface—e.g., a tablet, laptop, or another human interfaceable device) and the bottles needed to deploy on the bottling line at 2302. The user may load a dashboard via the HMI at 2304 and logging into the dashboard via the HMI at 2306. A user may enter the bottling line of interest at 2308. The user may enter the bottling line of interest by typing or filling in an identifier by a free-fill form, according to some embodiments. According to other embodiments, the bottling line may be selected by a user via a dropdown menu or a pre-filled list of bottling line identifiers. Once a particular bottling line has been selected, the system may determine whether the selected bottling line is new or has previously been used at 2310. If new, the line may be provisioned by the administrator of the sensor bottle system. If the bottling line is already provisioned, a required number of sensor bottles is automatically loaded into the dashboard. The user may select or otherwise enter the appropriate number of sensor bottles into the dashboard. In some embodiments, the appropriate number of sensor bottles may be greater than or equal to the number loaded into the dashboard.

If the bottling line is new, the system provisioning will include the user providing information such as the number of capper heads on the turret at 2312. According to some embodiments, if the bottling line is not new, the system has previously received the number of capper heads associated with the bottling line and identifies the number accordingly. Once a bottling line and its associated number of capper heads have been identified, the user may select the proper number of bottles available in the bottling line at 2314. According to some embodiments, the system may check that the number of bottles provided by the user at 2314 matches the number of capper heads ready for bottling at 2316. If the number of bottles provided by the user does not match the number of capper heads ready for bottling, the user may be prompted to check the number(s) again and re-prompt the user for an updated number. If the number of bottles provided by the user does match the number of capper heads ready for bottling, the bottling procedure 2300 may send details at 2318 regarding the user and bottle IDs to the cloud, according to some embodiments. Bottling procedure 2300 may further proceed to reading the available sensors from a first bottle, according to some embodiments.

According to some embodiments, one of the sensors read by the system may include the top-load sensor. Once the top-load sensor reaches a pre-determined threshold at 2320, the system proceeds to read from the available sensors in the first bottle. For example, bottling procedure 2300 demonstrates activating the first bottle's RFID reader at 2322, confirming RFID tags are found at 2324, and reading data from the found RFID tags at 2326. The RFID data may be stored in the MSR, according to some embodiments. In some embodiments, the RFID data may bypass MSR and be transmitted directly to the gateway. According to some embodiments, bottling procedure 2300 further demonstrates reading top-load data and storing the top-load data in the MSR at 2328. According to some embodiments, bottling procedure 2300 further demonstrates reading thread/pilfer roller forces and storing the force data in the MSR at 2330. According to some embodiments, bottling procedure 2300 further demonstrates reading thread/pilfer roller positions and storing the position data in the MSR at 2332.

According to some embodiments, once the top-load data falls below a particular threshold at 2334, the data may stop being collected and stored in the MSR at 2336, according to some embodiments. The data stored in the MSR may be transmitted to the cloud, along with network data (e.g., WiFi ID, etc.) at 2338. In other embodiments, the data may bypass the MSR and be transmitted to the cloud through a gateway. According to some embodiments, the Wi-Fi may be temporarily turned off during some or all of the bottling procedure 2300. According to some embodiments, Wi-Fi may be turned on for transmission purposes, such as the data transmission at 2338.

In some embodiments, a data analytics service may be executed by a data collection and analytics server (e.g., data collection and analytics server 630) of the cloud. Data received at the cloud may be stored along with its associated time and date at 2340, according to some embodiments. According to some embodiments, the data may be displayed at a cloud UI as control factors read from the sensors of the bottling line. The data may also be directed through predictive mathematical models 2342(a)-(i) to interpret the data and predict failure patterns identified in the data. According to some embodiments, models 2342(a)-(i) may perform predictive analyses on the data and output results such as secure seal, oxygen transmission, slip torque, break torque, broken bridges, spinners, lifters, cut threads, cut pilfer, among other prediction data.

Models 2342(a)-(i) may test for a wide variety of defects associated with a bottling line and/or the finished bottles produced therefrom. For example, model 2342(a) may determine whether a package is capable of retaining a certain pressure, model 2342(b) may determine whether a seal provides proper oxygen transmission rates, model 2342(c) may determine whether a capped package will have the proper slip torque for a consumer to remove it comfortably, model 2342(d) may determine whether a capped package will have the proper bridge breaking torque for a consumer to remove it comfortably, model 2342(e) may determine whether a cap's bridges are broken by the bottling procedure, model 2342(f) may determine whether a cap's threads strip before the bridges break ("spinners") when a consumer attempts to open the package, model 2342(g) may determine whether a cap's skirt fails to remain on the bottle after opening due to unbroken bridges when a consumer attempts to open the package, model 2342(h) may determine whether a cap's threads are cut during the bottling process, and model 2342(i) may determine whether a cap's pilfer is cut, according to some embodiments.

In some embodiments, finished package defects may be associated with a particular step in the raw material production such as screw cap and/or bottle manufacturing and/or bottling process, and cap application. Each of these steps include adjustments and control of various factors. For example, the application of a screw cap to the bottle's finish will be affected by control factors associated with the capper head, such as capper height, top-load, pilfer roller force, pilfer roller position, thread roller force, and thread roller position. As another example, manufacturing of the screw cap may be affected by control factors associated with the screw cap and its bridge, along with the type of metal used to produce the cap (e.g., light gauge, standard gauge). Yet another example may include the forming of the glass finish, which is affected by control factors such as mold design, glass temperature, cooling time, hot end coating types and application, and cold end coating types and application. Data received from the bottling line may include sensor data indicative of the impact for glass, capper heads and screw caps.

According to some embodiments, each control factor may be assigned a predetermined range of acceptable values. Sensor data that falls within the predetermined range may indicate a properly working component of the bottling procedure. Sensor data that falls outside the predetermined range of control factors may indicate a defect or a potentially malfunctioning finished package. Accordingly, each model analyzes a bottling line's sensor data compared to the predetermined range of control factors, according to some embodiments. In doing so, each model may determine control factors that might be adjusted to correct the potential defect and to what extent the control factor should be adjusted.

Furthermore, by understanding how control factors map to components of the bottling procedure, the models provided by the data analytics service may generate predictions indicative of prescriptive analytics that may be applied to the bottling line and sent to the user to improve bottling performance. According to some embodiments, predictive models are generated and updated according to sensor data, identified defects, and/or other data associated with the bottling procedure.

The analyses, predictions, and other prescriptive analytic results of the mathematical models 2342(a)-(i) may be displayed as information on the cloud UI (e.g., customer dashboard) at 2344, according to some embodiments. A user may review the information on the cloud UI and apply the adjustments accordingly, in some embodiments. According to other embodiments, a user may select an element of the cloud UI to request that the system automatically apply adjustments according to the prescriptive analytics. According to yet other embodiments, the data analytics service may apply adjustments according to the prescriptive analytics without requiring the user's confirmation.

According to some embodiments, the data analytics service and modelling (e.g., data collection and analytics server 630) may be performed by edge devices and transmit results to cloud servers (e.g., 2340) for storage. Data analytics service performed by edge devices may receive updates from the cloud for maintaining up-to-date models and/or machine learning modules. According to other embodiments, data analysis and modelling may be performed by remote servers (e.g., the cloud) and applied as predictive models on edge devices of a network. Nevertheless, data analysis, modelling, and the application thereof may be performed in part by at least one or more of edge devices, remote servers, and/or a combination thereof.

Figure 24:
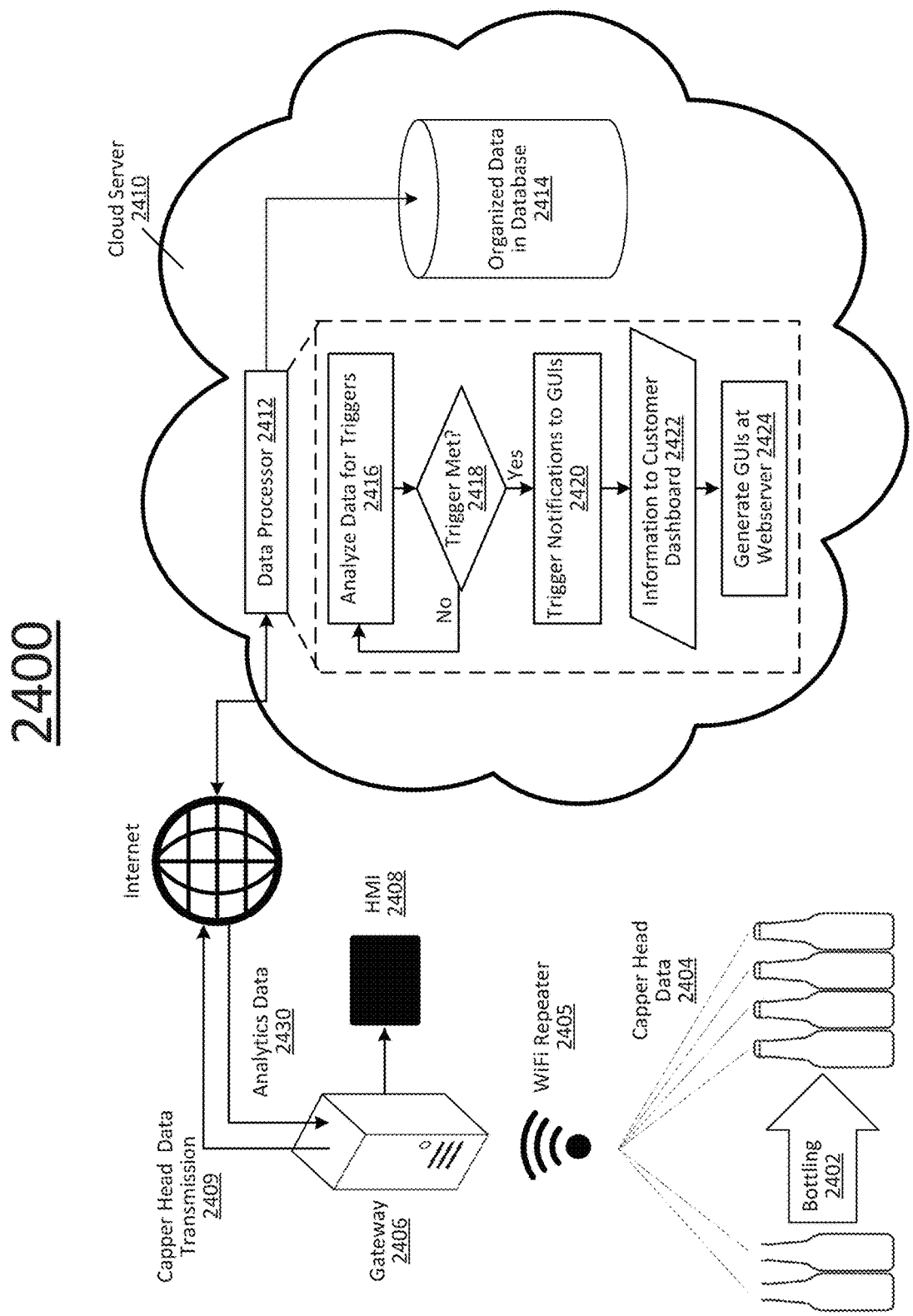
FIG. 24 depicts a flow chart of an exemplary data transmission procedure for a bottling line system, according to some embodiments.

FIG. 24 depicts a flow chart of an exemplary data transmission procedure for a bottling line system, according to some embodiments. According to some embodiments, bottle sensor data 2404 may be received at WiFi repeater 2405 for transmission to the gateway 2406 from the wireless module of each bottle during the bottling procedure 2402. The bottle data received at the gateway may include one or more of the following: (1) information about the battery level of the bottle; (2) bottle ID; (3) RFID of the capper head; (4) the bottling line turret ID; and (5) sensor readings of one or more of the following sensors: (a) top-load, (b) thread roller A force, (c) thread roller A position, (d) thread roller B force, (e) thread roller B position, (f) pilfer roller A force, (g) pilfer roller A position, (h) pilfer roller B force, and (i) pilfer roller B position.

Once data transmission 2409 has been received at cloud server 2410, data processor 2412 stores the received data, such as the bottle sensor data, in an organized database 2414. Data processor 2412 also analyzes bottling data transmission 2409 for triggers at 2416. According to some embodiments, this analysis may be performed by applying analytics models (e.g., models 2342(*a*)-(*i*)) to bottling data 2409 to determine if a trigger has been met.

During a bottling procedure 2402, bottling data 2404 may be immediately transmitted as bottling data transmission 2409 to cloud server 2410 for detecting bottle and bottling line equipment defects based on the capper head set point specifications, according to some embodiments. In some embodiments, HMI 2408 may display data returned from cloud server 2410 (e.g., analytics data 2430). For example, if a capper head setting is outside of a specification, a notification may be triggered at 2420 to be displayed by the GUI of cloud server 2410. In response to a notification being triggered, the notification and associated information may be transmitted to a webserver to be displayed on a customer dashboard at 2422. Once the notification and associated information is received at the webserver, the webserver may generate new GUIs at 2424 based on the newly received notification and associated information, according to some embodiments.

This organized database 2414 can be used for analytics purposes to predict when capper head parts should be replaced and when the capper head will likely need to be removed from commercial production for maintenance. This will allow for logical and structural maintenance scheduling, which can prevent package defects and unplanned commercial downtime.

One of ordinary skill in the art will appreciate that not all bottling line systems will have all these components and may have other components in addition to, or in lieu of, those components mentioned here. Furthermore, while these components are viewed and described separately, various components may be integrated into a single unit in some embodiments.

The various embodiments described above are provided by way of illustration only and should not be construed to limit the claimed invention. Those skilled in the art will readily recognize various modifications and changes that may be made to the claimed invention without following the example embodiments and applications illustrated and described herein, and without departing from the true spirit and scope of the claimed invention.

What is claimed is:

1. A system, comprising:
a bottle configured to be deployed in a bottling line system, the bottle comprising:
an outer layer;
a reservoir tube inside the outer layer that connects a reservoir inside the outer layer to a neck of the bottle, wherein the reservoir tube is configured to receive at least one of a rinse solution or a beverage from the bottling line system;
a battery inside the outer layer;
one or more sensors powered by the battery, the one or more sensors configured to collect data related to operating conditions in the bottling line system; and
a communication module;
a network gateway communicatively coupled to the communication module and a human machine interface; and
a platform server communicatively coupled to the network gateway, the platform server comprising:
an edge communication module;
a data store;
a data analytics module; and
a user communication module.

2. The system of claim 1, wherein the network gateway is configured to perform operations comprising:
providing a back-end application programming interface from the edge communication module comprising one or more microservices;
receiving, from the communication module of the bottle, sensor data generated by the one or more sensors coupled to the bottle;
writing sensor data to a data file in a gateway data store, wherein the data file comprises other sensor data from other bottles;
transmitting the data file to the edge communication module of the platform server.

3. The system of claim 1, wherein the operations further comprise:
determining whether the sensor data is within a predetermined acceptable range;
transmitting an indication of the sensor data to a human machine interface for displaying to a user; and
transmitting the sensor data to the edge communication module of the platform server.

4. The system of claim 3, wherein the indication comprises:
a representation that the sensor data is within the predetermined acceptable range for displaying on the human machine interface; or
the sensor data that is outside of the predetermined acceptable range for displaying on the human machine interface.

5. The system of claim 1, wherein the operations further comprise:
receiving, from the communication module of the bottle, sensor data generated by the one or more sensors coupled to the bottle as bottling systems are being adjusted, wherein the sensor data represents user adjustments to the sensors;
transmitting, to the human machine interface, an indication of the sensor data as system adjustments are being made for displaying to the user;
receiving, from the human machine interface, user confirmation that the sensor data is within the predetermined acceptable range;
transmitting the adjusted sensor data to the edge communication module of the platform server.

6. The system of claim 1, wherein the platform server comprises instructions that, when executed by one or more processors of the platform server, are able to cause the one or more processors to perform operations comprising:
receiving the sensor data from the network gateway;
storing the sensor data in the data store;
routing data to one or more prediction models for interpreting how system settings impact system and products produced by system;
generating output data based on the one or more prediction models as a function of the sensor data; and
storing the qualitative output data in the data store.

7. The system of claim 6, wherein the output data comprises predictive diagnostic data indicative of system adjustments required for improving a bottling procedure.

8. The system of claim 6, wherein the one or more prediction models comprise mathematical models created using design-of-experiment or data mining platforms such as decision trees, PLS, and/or ANN's.

9. The system of claim 6, wherein the operations further comprise:
   receiving sensor data from system adjusted factors at the network gateway; and
   generating one or more predictions from updated outputs from prediction models based at least in part on the sensor data.

10. The system of claim 2, wherein the sensor data comprises identification data generated by a radio frequency identification (RFID) reader indicative of a bottling line ID and a relative system position ID.

11. The system of claim 1, wherein the user communication module provides a graphical user interface for displaying data in the data store.

12. The system of claim 1, wherein the bottling line system is configured to fill containers with a beverage.

13. The system of claim 12, wherein the containers comprise glass bottles, and wherein the beverage comprises wine, sparkling wine, or a spirit.

14. The system of claim 1, wherein the bottling line system comprises a screw-cap bottling line system comprising a bottle rinser, a filler, a headspace inerter, a capper, a capsuler, and a labeler.

15. The system of claim 1, wherein the bottling line system comprises a cork closure bottling line system comprising a bottle rinser, a filler, a headspace inerter, a corker, a capsuler, and a labeler.

16. The system of claim 1, wherein the data relates to at least one of temperature, pressure, speed, vibration, pH, or chemical concentration in the bottling line system.

17. The system of claim 1, wherein the one or more sensors comprise at least one of an internal pressure sensor, an internal temperature sensor, and an internal chemical sensor.

18. The system of claim 1, wherein the one or more sensors comprise a level sensor configured to measure a beverage fill height in the bottle.

19. The system of claim 1, wherein the one or more sensors comprise an oxygen sensor.

20. The system of claim 1, wherein the one or more sensors comprise a carbon dioxide sensor.

21. The system of claim 1, wherein the one or more sensors are configured to measure at least one of top-load force, thread roller position, thread roller force, pilfer roller position, or pilfer roller force.

* * * * *